(12) United States Patent
Kawamura

(10) Patent No.: US 10,967,820 B2
(45) Date of Patent: Apr. 6, 2021

(54) POWER SOURCE CONTROL DEVICE, BATTERY PACK, AND POWER SOURCE SYSTEM

(71) Applicant: DENSO CORPORATION, Kariya (JP)

(72) Inventor: Hideki Kawamura, Kariya (JP)

(73) Assignee: DENSO CORPORATION, Kariya (JP)

(*) Notice: Subject to any disclaimer, the term of this patent is extended or adjusted under 35 U.S.C. 154(b) by 112 days.

(21) Appl. No.: 16/514,673

(22) Filed: Jul. 17, 2019

(65) Prior Publication Data
US 2019/0337475 A1    Nov. 7, 2019

Related U.S. Application Data

(63) Continuation of application No. PCT/JP2017/042496, filed on Nov. 28, 2017.

(30) Foreign Application Priority Data

Feb. 2, 2017  (JP) .............................. JP2017-017779

(51) Int. Cl.
*B60R 16/033*  (2006.01)
*H02J 7/00*    (2006.01)
*H02J 9/06*    (2006.01)

(52) U.S. Cl.
CPC .......... *B60R 16/033* (2013.01); *H02J 7/0068* (2013.01); *H02J 9/06* (2013.01)

(58) Field of Classification Search
CPC ...... B60R 16/033; B60R 16/03; H01M 10/44; H01M 10/48; H02J 9/06; H02J 7/0068; Y02E 60/10
See application file for complete search history.

(56) References Cited

U.S. PATENT DOCUMENTS

| 6,211,681 | B1* | 4/2001 | Kagawa | B60L 3/0046 324/426 |
| 2005/0253458 | A1* | 11/2005 | Omae | H01M 16/00 307/10.1 |
| 2015/0001857 | A1* | 1/2015 | Sekiguchi | F02N 11/0848 290/38 C |
| 2015/0028677 | A1* | 1/2015 | Iwasaki | H02J 9/062 307/52 |
| 2016/0257270 | A1* | 9/2016 | Teramoto | H01M 10/48 |
| 2017/0346292 | A1* | 11/2017 | Handelsman | H02J 7/0068 |

FOREIGN PATENT DOCUMENTS

JP  2016-107879 A  6/2016

* cited by examiner

*Primary Examiner* — Jared Fureman
*Assistant Examiner* — Duc M Pham
(74) *Attorney, Agent, or Firm* — Oliff PLC

(57) ABSTRACT

A power source system includes a first power source, a power generator, a first electrical load, a second electrical load, a second power source, and a charge/discharge switch provided between the second power source and the power generator. The charge/discharge switch is controlled into a closed state to electrically connect the power generator to the second power source, when an amount of charge of the second power source is less than a charge request threshold, the power generator is in a power generating state, and an amount of power generated by the power generator is equal to or more than a total power requirement as a total sum of respective amounts of power required by the second power source, the first electrical load, and the second electrical load.

17 Claims, 16 Drawing Sheets

US 10,967,820 B2

POWER SOURCE CONTROL DEVICE, BATTERY PACK, AND POWER SOURCE SYSTEM

CROSS REFERENCE TO RELATED APPLICATIONS

The present application is a continuation application of International Patent Application No. PCT/JP2017/042496 filed on Nov. 28, 2017, which designated the U.S. and claims the benefit of priority from Japanese Patent Application No. 2017-17779 filed on Feb. 2, 2017. The entire disclosures of all of the above applications are incorporated herein by reference.

TECHNICAL FIELD

The present disclosure relates to a power source control device, a battery pack, and a power source system.

BACKGROUND

For example, it is known an automotive power source device including a main battery, a battery unit, an alternator, a normal load, three relays, and an emergency load. In such an automotive power source device, the main battery is connected to each of the alternator, the normal load, and the emergency load. The battery unit is connected to the alternator and to the normal load through the three relays. As the three relays, there are a first relay, a second relay, and a third relay. The battery unit is connected to the emergency load through the third relay. The emergency load needs to continue power supply.

SUMMARY

The present disclosure describes a power source control device, a battery pack, and a power source system which perform power supply to electrical loads.

BRIEF DESCRIPTION OF DRAWINGS

The above and other objects, features and advantages of the present disclosure will become more apparent from the following detailed description made with reference to the accompanying drawings, in which.

DETAILED DESCRIPTION

Figure 1:
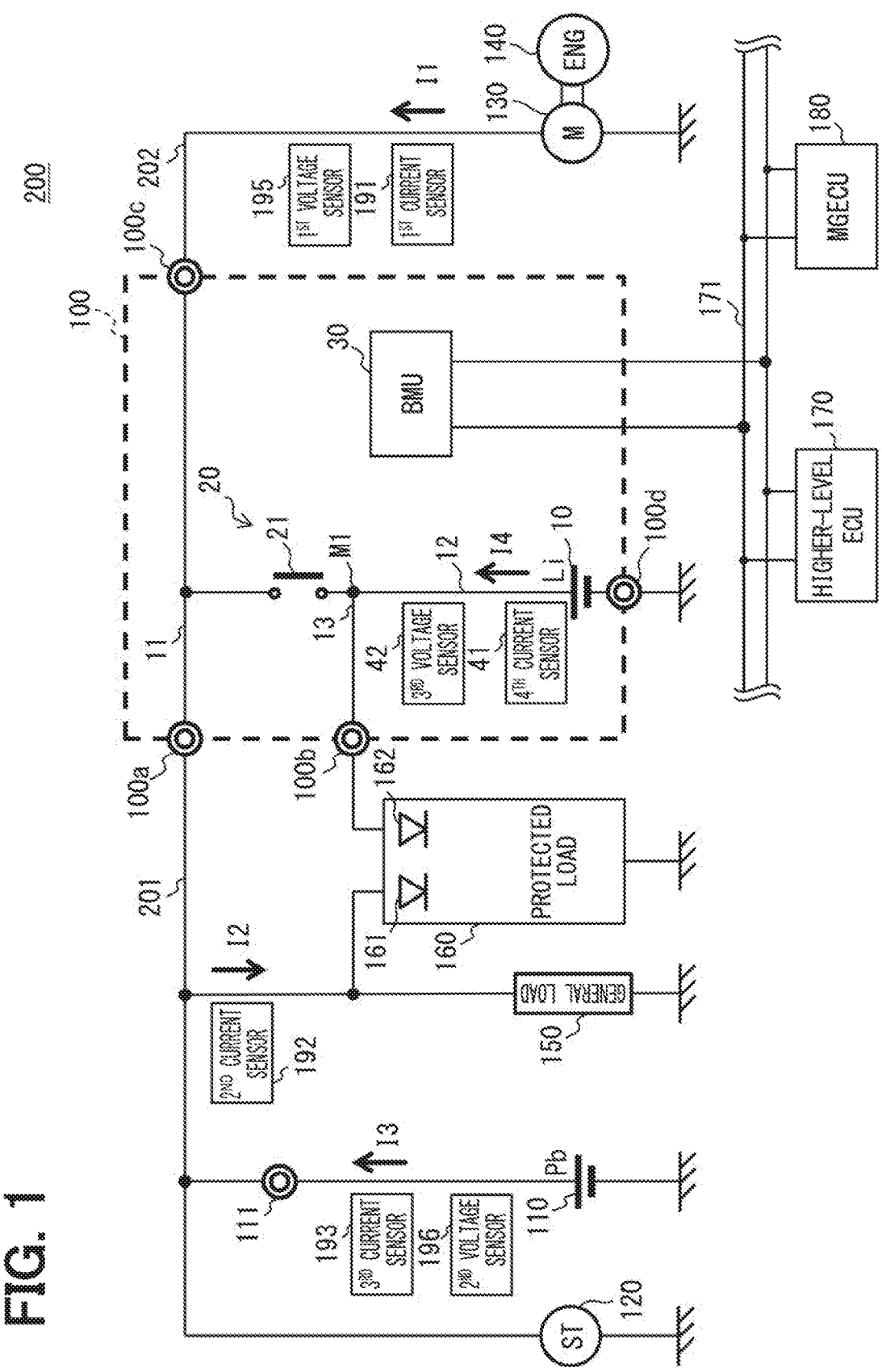
FIG. 1 is a block diagram showing a schematic configuration of a power source system.

For example, an automotive power source device may include a main battery, a battery unit, an alternator, a normal load, three relays, and an emergency load. In such an automotive power source device, the main battery is connected to each of the alternator, the normal load, and the emergency load. The battery unit is connected to the alternator and to the normal load through the three relays. As the three relays, there are a first relay, a second relay, and a third relay. The battery unit is connected to the emergency load through the third relay. The emergency load needs to continue power supply.

When power generation by the alternator is stopped during the running of an automobile, the first relay is controlled into a non-conductive state, while each of the second relay and the third relay is controlled into a conductive state. In this case, the battery unit is brought into a state non-conductive to each of the alternator and the normal load. However, the battery unit and the emergency load are in the conductive state so that power is supplied from the battery unit to the emergency load. Note that, from the main battery, power is supplied to each of the normal load and the emergency load.

When the alternator is activated by regenerative control, each of the three relays is controlled into the conductive state. In this case, generated power output from the alternator is supplied to each of the normal load, the emergency load, and the battery unit. When an output voltage from the main battery is lower than a generated voltage, the generated power is supplied also to the main battery. However, when the output voltage from the main battery is higher than the generated voltage, the generated power is not supplied to the main battery. In this case, power is supplied from the main battery to the normal load and to the emergency load.

In the state where each of the three relays is brought into the conductive state, when the connection to the main battery is cut off, power supply from the main battery to each of the normal load and the emergency load is interrupted. In this case, the power supply to each of the battery unit, the normal load, and the emergency load is performed only by the alternator. When the amount of power generated by the alternator is less than the amount of power required by the battery unit, the normal load, and the emergency load, the amount of power supplied to the emergency load may decrease to bring the emergency load into an OFF state.

The present disclosure provides a power source control device, a battery pack, and a power source system which restricts, even when a power supply to a first power source such as a main battery is interrupted, a second electrical load such as an emergency load from being bought into an OFF state.

According to an embodiment of the present disclosure, a power source control device is to be provided in a power source system including a first power source, a power generator, a first electrical load electrically connected to each of the first power source and the power generator, a second electrical load electrically connected to the power generator and brought into an OFF state when an amount of supplied power becomes less than a reset threshold, a second power source electrically connected to each of the second electrical load and the power generator, and a charge/discharge switch provided between the second power source and the power generator.

When an amount of charge of the second power source is less than a charge request threshold, the power generator is in a power generating state, and an amount of power generated by the power generator is equal to or more than a total power requirement as a total sum of respective amounts of power required by the second power source, the first electrical load, and the second electrical load, the charge/discharge switch is brought into a closed state to electrically connect the power generator to the second power source.

According to an embodiment of the present disclosure, a battery pack is to be provided in a power source system including a first power source, a power generator, a first electrical load electrically connected to each of the first power source and the power generator, and a second electrical load electrically connected to the power generator and brought into an OFF state when an amount of supplied power becomes less than a reset threshold. The battery pack includes a second power source electrically connected to each of the second electrical load and the power generator, a charge/discharge switch provided between the second power source and the power generator, and a battery control unit which controls the charge/discharge switch to be opened or closed. When an amount of charge of the second power source is less than a charge request threshold, the power generator is in a power generating state, and an amount of power generated by the power generator is equal to or more than a total power requirement as a total sum of respective amounts of power required by the second power source, the first electrical load, and the second electrical load, the battery control unit controls the charge/discharge switch into a closed state to electrically connect the power generator to the second power source.

According to an embodiment of the present disclosure, a power source system includes a first power source, a power generator, a first electrical load electrically connected to each of the first power source and the power generator, a second electrical load electrically connected to the power generator and brought into an OFF state when an amount of supplied power becomes less than a reset threshold, a second power source electrically connected to each of the second electrical load and the power generator, a charge/discharge switch provided between the second power source and the power generator, and a power source control device which controls the charge/discharge switch to be opened or closed. When an amount of charge of the second power source is less than a charge request threshold, the power generator is in a power generating state, and an amount of power generated by the power generator is equal to or more than a total power requirement as a total sum of respective amounts of power required by the second power source, the first electrical load, and the second electrical load, the power source control device controls the charge/discharge switch into a closed state to electrically connect the power generator to the second power source.

In the foregoing configurations, when the amount of charge of the second power source is less than the charge request threshold, the power generator is in the power generating state, and the charge/discharge switch is in the closed state, the first power source and the power generator serve as power supply sources. At this time, when the electrical connection between the first power source and the first electrical load is cut off and the power supply from the first power source is interrupted, it is difficult for the power generator to solely cover the total power requirement. As a result, the amount of power supplied to the second electrical load may become less than the reset threshold, and the second electrical load may be brought into the OFF state.

Accordingly, in each of the configurations according to the foregoing first to third aspects, when the amount of power generated by the power generator is equal to or more than the total power requirement, the charge/discharge switch is brought into the closed state. As a result, even when the electrical connection between the first power source and the first electrical load is cut off and the power supply from the first power source is interrupted, the amount of power supplied from the power generator to the second electrical load is restricted from being less than the reset threshold. As a result, the second electrical load is restricted from being brought into the OFF state.

In addition, the charging of the second power source tends to be easily performed to a degree that the charge request threshold is exceeded. Accordingly, after the power generation by the power generator is ended, the amount of power supplied from the second power source to the second electrical load is restricted from being less the reset threshold. This also restricts the second electrical load from being brought into the OFF state.

Various embodiments of the present disclosure being applied to a power source system mounted in a vehicle will hereinafter described on the basis of the drawings.

First Embodiment

The power source system according to the present embodiment will be described on the basis of FIGS. 1 to 9.

A power source system 200 includes a plurality of in-vehicle devices mounted in a vehicle and a battery pack 100. A lead storage battery 110 is one of the in-vehicle devices. The battery pack 100 has a lithium storage battery 10. The power source system 200 forms a double power source system by including the lead storage battery 110 and the lithium storage battery 10.

An engine 140 is another of the in-vehicle devices. The vehicle in which the power source system 200 is mounted has an idling stop function which stops the engine 140 when predetermined stopping conditions are satisfied and restarts the engine 140 when predetermined starting conditions are satisfied.

As shown in FIG. 1, the power source system 200 has, in addition to the lead storage battery 110 and the engine 140 each described above, a stator motor 120, a rotary electric machine 130, a general load 150, a protected load 160, a higher-level ECU 170, and a MGECU 180. Each of the lead storage battery 110, the stator motor 120, the general load 150, and the protected load 160 is electrically connected to the battery pack 100 through a first wire 201. The rotary electric machine 130 is electrically connected to the battery pack 100 through a second wire 202.

Each of the first wire 201 and the second wire 202 includes wire harnesses. One ends of the plurality of wire harnesses included in the first wire 201 are electrically connected to each of the lead storage battery 110, the stator motor 120, the general load 150, and the protected load 160. The other ends of the individual wire harnesses are electrically connected together with a first fuse box, which is not shown. The first fuse box has two connection terminals, and the respective tip ends of the two connection terminals are mechanically and electrically connected to the battery pack 100.

Likewise, one of the one ends of the plurality of wire harnesses included in the second wire 202 is connected to the rotary electric machine 130. The other ends of the individual wire harnesses are electrically connected to a second fuse box, which is not shown. The second fuse box has one connection terminal, and the tip end of the connection terminal is mechanically and electrically connected to the battery pack 100.

Though not shown, each of the first fuse box and the second fuse box has a bus bar, a fuse, a connection terminal, and a resin case. The resin case contains the bus bar. In the bus bar, the fuse is provided. At an end portion of the bus bar, the connection terminal is provided. To the bus bar, each of the wire harnesses is connected. The connection terminal is connected to the battery pack 100.

Note that the higher-level ECU 170 is electrically connected to each of the lead storage battery 110 and the battery pack 100 through a wire, which is not shown. Likewise, the MGECU 180 is electrically connected to each of the lead storage battery 110 and the battery pack 100 through a wire, which is not shown.

As shown above, the power source system 200 uses the lead storage battery 110 and the battery pack 100 (lithium storage battery 10) as power sources. The following will individually describe each of the components of the power source system 200.

The lead storage battery 110 generates an electromotive voltage using a chemical reaction. The lead storage battery 110 is mechanically and electrically connected with a bolt to one end of one of the plurality of wire harnesses included in the first wire 201. In FIG. 1, a Pb terminal 111 to be bolted in the lead storage battery 110 is shown by the double circle. The lead storage battery 110 corresponds to a first power source.

The starter motor 120 starts the engine 140. The starter motor 120 is mechanically coupled to the engine 140 upon starting of the engine 140. The starter motor 120 rotates using the lead storage battery 110 as a power supply source. The rotation causes the crankshaft of the engine 140 to rotate. When the rotation speed of the crankshaft of the engine 140 exceeds a predetermined rotation speed, a misty fuel is injected from a fuel injection valve into a combustion chamber. At this time, an ignition plug generates sparks. As a result, the fuel is exploded, and the engine 140 starts autonomous rotation. The resulting power of the engine 140 is transferred to vehicle running. Note that, when the engine 140 has started the autonomous rotation, the starter motor 120 is mechanically decoupled from the engine 140.

The rotary electric machine 130 performs a powered operation and power generation. The rotary electric machine 130 corresponds to a power generator. To the rotary electric machine 130, an inverter not shown is connected. The inverter is electrically connected to the second wire 202.

The inverter converts the dc voltage supplied from at least one of the lead storage battery 110 and the lithium storage battery 10 of the battery pack 100 to an ac voltage. The ac voltage is supplied to the rotary electric machine 130. As a result, the rotary electric machine 130 performs the powered operation.

The rotary electric machine 130 is coupled to the engine 140. The rotary electric machine 130 and the engine 140 can transmit rotation energy to each other through a belt or the like. The rotation energy resulting from the powered operation by the rotary electric machine 130 is transmitted to the engine 140. This accelerates the rotation of the engine 140. Consequently, vehicle running is assisted. As described above, the vehicle in which the power source system 200 is mounted has the idling stop function. The rotary electric machine 130 performs the function of not only assisting vehicle running, but also rotating the crankshaft upon restarting of the engine 140.

The rotary electric machine 130 also has the function of generating power using at least one of the rotation energy of the engine 140 and the rotation energy of the wheels of the vehicle. By generating power, the rotary electric machine 130 generates an ac voltage. The ac voltage is converted by the inverter to a dc voltage, which is supplied to the battery pack 100. The dc voltage supplied to the battery pack 100 is supplied also to each of the lead storage battery 110, the general load 150, and the protected load 160.

When an output voltage from the lead storage battery 110 is lower than the voltage generated from the rotary electric machine 130, the lead storage battery 110 is charged. However, when the output voltage from the lead storage battery 110 is higher than the generated voltage, the lead storage battery 110 is not charged, but is discharged. In this case, from the lead storage battery 110, power is supplied to the general load 150 and to the protected load 160.

Though not shown, to the rotary electric machine 130, a regulator is connected. The regulator controls a supply of the generated voltage to the battery pack 100 such that the voltage of the power generated by the rotary electric machine 130 is equal to the required voltage input from the MGECU 180. To be more precise, the regulator detects the voltage between the rotary electric machine 130 and the battery pack 100 to perform feedback control of the supply of the generated power voltage to the battery pack 100 such that the value of the detected voltage is equal to the value of the required voltage mentioned above.

Due to variations in the respective amounts of charge of the battery pack 100 and the lead storage battery 110 and in the respective amounts of power required by the general load 150 and the protected load 160, the voltage between the rotary electric machine 130 and the battery pack 100 varies. The regulator controls the supply of the generated power voltage to the battery pack 100 such that the variations fall within the limits placed by the required voltages mentioned above. Note that, needless to say, the maximum value (available power amount) of the power that can be generated by the rotary electric machine 130 varies depending on the running state of the vehicle or on the operating state of the engine 140. Accordingly, while the regulator is attempting to perform the feedback control of the supply of the generated power voltage to the battery pack 100 so as to suppress the voltage variation mentioned above, when the amount of supply reaches the available power amount, the voltage variation can no longer be suppressed. As will be described later, such a situation may result from the interruption of the power supply from the lead storage battery 110 to the general load 150 or to the protected load 160.

The engine 140 generates a force to drive the vehicle by performing fuel combustion driving. As described above, when the engine 140 is started, the stator motor 120 rotates the crankshaft. However, after the engine 140 is stopped once by an idling stop, when the engine 140 is re-started and the predetermined starting conditions described above are satisfied, the rotary electric machine 130 rotates the crankshaft.

The general load 150 is an in-vehicle device such as a seat heater, a blast fan, an electric compressor, a room light, or headlights. The amount of power required by the general load 150 varies depending on the operation by a user riding in the vehicle or the like. The general load 150 corresponds to a first electrical load.

The protected load 160 is an electric shift position, an electric power steering (EPS), a brake (ABS), a door lock, a navigation system, an audio device, or the like which requires the power supplied thereto to be constant. The protected load 160 has a property of being switched from an ON state into an OFF state when the voltage supplied thereto becomes less than a reset threshold. The protected load 160 corresponds to a second electrical load.

Note that the in-vehicle devices include the lighting device of an instrumental panel. The lighting device neither requires the power supplied thereto to be constant nor has the property of being switched into the OFF state when the voltage supplied thereto becomes less than the reset threshold. However, to allow the user to operate the vehicle, display on the instrumental panel is indispensable. Accordingly, a power supply equal to that to the protected load 160 should be ensured for the lighting device of the instrumental panel. To satisfy a request to ensure such a power supply, the lighting device of the instrumental panel is substantially included in the protected load 160. Likewise, even an in-vehicle device which neither requires the power supplied thereto to be constant nor has the property of being switched into the OFF state when the supplied voltage becomes less than the reset threshold is included in the protected load 160 as long as the in-vehicle device is closely associated with vehicle running. Thus, the protected load 160 is an electrical load more closely associated with vehicle running than the general load 150.

Note that the in-vehicle devices also include wipers. The wipers are indirectly associated with vehicle running. Accordingly, the wipers may belong either to the general load 150 or to the protected load 160. Moreover, the headlights described above are also indirectly associated with vehicle running. Accordingly, the headlights may also belong to the protected load 160, not to the general load 150.

As shown above, the power supply to the protected load 160 needs to be constantly performed in association with vehicle running. The power supply to the protected load 160 closely associated with vehicle running is constantly performed by at least one of the lead storage battery 110 and the lithium storage battery 10. During the regeneration of the rotary electric machine 130, power is supplied also from the rotary electric machine 130 to the protected load 160. During the powered operation by the rotary electric machine 130, the power supply to the rotary electric machine 130 is performed by the lead storage battery 110. At this time, the power supply to the protected load 160 is mainly performed from the lithium storage battery 10. When the rotary electric machine 130 is not driven, the power supply to the protected load 160 is performed by the lead storage battery 110 and by the lithium storage battery 10.

To the protected load 160, an anti-reverse-flow element for restricting a current from flowing out of the protected load 160 is connected. Specifically, in the present embodiment, a first diode 161 and a second diode 162 are anti-reverse-flow elements.

The first diode 161 is provided between the protected load 160 and each of the lead storage battery 110 and the general load 150. The anode electrode of the first diode 161 is closer to the lead storage battery 110 and to the general load 150, while the cathode electrode of the first diode 161 is closer to the protected load 160. The first diode 161 performs the function of restricting a current from flowing backward from the protected load 160 to the lead storage battery 110 and to the general load 150.

The second diode 162 is provided between the lithium storage battery 10 and the protected load 160. The anode electrode of the second diode 162 is closer to the lithium storage battery 10, while the cathode electrode of the second diode 162 is closer to the protected load 160. The second diode 162 performs the function of restricting a current from flowing backward from the protected load 160 to the lithium storage battery 10.

The higher-level ECU 170 and the MGECU 180 are included in the various ECUs mounted in the vehicle. The various ECUs are electrically connected to each other through a bus wire 171 to construct an in-vehicle network. Under cooperative control performed by the various ECUs, combustion in the engine 140, power generation by the rotary electric machine 130, and the like are controlled. The higher-level ECU 170 controls the battery pack 100, while the MGECU 180 controls the rotary electric machine 130. The control of the battery pack 100 by the higher-level ECU 170 will be described later in detail. The higher-level ECU 170 corresponds to a higher-level control unit. The MGECU 180 corresponds to a power generation control unit.

Note that each of the higher-level ECU 170 and the MGECU 180 has the property of requiring the power supplied thereto to be constant, similarly to the protected load 160. Each of the higher-level ECU 170 and the MGECU 180 has the property of being switched from the ON state to the OFF state when the voltage supplied thereto becomes less than the reset threshold. Thus, each of the various ECUs has the property equivalent to that of the protected load 160 and is extremely closely associated with vehicle running. Accordingly, each of the various ECUs and a BMU 30 of the battery pack 100 described later is substantially included in the protected load 160. The power supply to each of the various ECUs is constantly performed by at least one of the lead storage battery 110 and the lithium storage battery 10.

The power source system 200 has, in addition to the individual in-vehicle devices described above, sensors for measuring physical quantities such as various voltages, various currents, and a temperature. Detection signals resulting from detection by the various sensors are input to the various ECUs. In FIG. 1, as representatives of the various sensors described above, current sensors and voltage sensors are shown.

Examples of the current sensors include a first current sensor 191, a second current sensor 192, and a third current sensor 193. The examples of the current sensors also include a fourth current sensor 41 included in the battery pack 100. The first current sensor 191 detects a current flowing in the rotary electric machine 130. The second current sensor 192 detects respective currents flowing in the general load 150 and the protected load 160. The third current sensor 193 detects a current flowing in the lead storage battery 110. The fourth current sensor 41 detects a current flowing in the lithium storage battery 10.

Examples of the voltage sensors include a first voltage sensor 195 and a second voltage sensor 196. The examples of the voltage sensors also include a third voltage sensor 42 included in the battery pack 100. The first voltage sensor 195 detects the voltage between the rotary electric machine 130 and the battery pack 100. The second voltage sensor 196 detects the voltage of the lead storage battery 110. The third voltage sensor 42 detects the voltage of the lithium storage battery 10.

Respective detection signals from the first current sensor 191, the second current sensor 192, and the third current sensor 193 are input to the higher-level ECU 170. Likewise, respective detection signals from the first voltage sensor 195 and the second voltage sensor 196 are input to the higher-level ECU 170. Respective detection signals from the fourth current sensor 41 and the third voltage sensor 42 are input to the BMU 30 of the battery pack 100.

Note that respective detection signals from the first current sensor 191 and the first voltage sensor 195 may also be input to the MGECU 180, not to the higher-level ECU 170. The detection signal from the second current sensor 192 may also be input to the ECU which controls the general load 150 and the protected load 160, not to the higher-level ECU 170. As described above, the various ECUs can transmit signals to each other through the bus wire 171. Accordingly, it is not particularly limited which sensor inputs the detection signal to which ECU.

When the rotary electric machine 130 is generating power, a first power obtained by multiplying the first current detected by the first current sensor 191 by the first voltage detected by the first voltage sensor 195 shows an amount of power generated and supplied by the rotary electric machine 130.

A second power obtained by multiplying the second current detected by the second current sensor 192 and the first voltage shows an amount of power (power usage) actually used by the general load 150 and the protected load 160. Accordingly, the power usage has a property depending on the amount of power required (amount of required power) by the general load 150 and the protected load 160 to be driven.

The third current detected by the third current sensor 193 corresponds to a current flowing in the lead storage battery 110. The second voltage detected by the second voltage sensor 196 corresponds to an output voltage from the lead storage battery 110. The third current and the second voltage are physical quantities related to the amount of power required by the lead storage battery 110.

The fourth current detected by the fourth current sensor 41 corresponds to the current flowing in the lithium storage battery 10. The third voltage detected by the third voltage sensor 42 corresponds to an output voltage from the lithium storage battery 10. The fourth current and the third voltage are physical quantities related to the amount of power required by the lithium storage battery 10.

In other words, the above-mentioned amount of power required by each of the lead storage battery 110 and the lithium storage battery 10 corresponds to the charge request amount of each of the storage batteries. The charge request amount of each of the storage batteries is determined in accordance with the state of charge (SOC) of the storage battery. "SOC" is the abbreviation of "state of charge". A low SOC means a high charge request so that the amount of required power is large. On the other hand, a high SOC means a low charge request so that the amount of required power is small. When each of the storage batteries is in a charged state, the charge request (amount of required power) is positive. On the other hand, when each of the storage batteries is in a discharged state, the charge request (amount of required power) is negative.

Each of the storage batteries generates an electromotive voltage using a chemical reaction. The electromotive voltage and the SOC are correlative. Accordingly, to calculate the SOC, it is appropriate to calculate the electromotive voltage. The storage battery generates the electromotive voltage using a chemical change but, due to a voltage drop resulting from the internal resistance of the storage battery, the storage battery does not output the electromotive voltage itself. The electromotive voltage from the storage battery has a value obtained by subtracting, from an output voltage from the storage battery, the voltage drop resulting from the internal resistance.

Accordingly, the electromotive voltage from the lead storage battery 110 has a value obtained by subtracting, from the second voltage, a value obtained by multiplying the third current by the internal resistance of the lead storage battery 110. The electromotive voltage from the lithium storage battery 10 has a value obtained by subtracting, from the third voltage, a value obtained by multiplying the fourth current by the internal resistance of the lithium storage battery 10. Note that the internal resistance of the storage battery can be calculated from, e.g., the inclination of a graph represented by a plurality of currents and a plurality of voltage which are detected during the charging of the storage battery.

The higher-level ECU 170 performs the arithmetic operation described above to calculate the electromotive voltage from the lead storage battery 110. The higher-level ECU 170 stores the correlation between the electromotive voltage from the lead storage battery 110 and the SOC. The higher-level ECU 170 calculates the SOC of the lead storage battery 110 on the basis of the calculated electromotive voltage and the correlation described above. In other words, the higher-level ECU 170 calculates the amount of power required by the lead storage battery 110.

Next, the battery pack 100 will be described. As shown in FIG. 1, the battery pack 100 has external connection terminals shown by the double circles. Examples of the external connection terminals include a first external connection terminal 100a, a second external connection terminal 100b, a third external connection terminal 100c, and a fourth external connection terminal 100d.

To each of the first external connection terminal 100a and the second external connection terminal 100b, the first fuse box described above is bolted. As a result, the battery pack 100 is electrically connected to each of the lead storage battery 110, the starter motor 120, the general load 150, and the protected load 160 through the first wire 201. To the third external connection terminal 100c, the second fuse box described above is bolted. Thus, the battery pack 100 is electrically connected to the rotary electric machine 130 through the second wire 202. The fourth external connection terminal 100d is intended to bolt the battery pack 100 to the body of the vehicle. The bolt inserted in the fourth external connection terminal 100d performs the function of connecting the battery pack 100 to the body of the vehicle. As a result, the battery pack 100 is body-earthed.

The battery pack 100 has, as internal wires, a first internal wire 11, a second internal wire 12, and a third internal wire 13. The first internal wire 11 electrically connects the first external connection terminal 100a and the third external connection terminal 100c. The second internal wire 12 electrically connects the first internal wire 11 and the fourth external connection terminal 100d. The third internal wire 13 electrically connects the second internal wire 12 and the second external connection terminal 100b.

As shown in FIG. 1, the battery pack 100 has the lithium storage battery 10, a change-over switch 20, the BMU 30, the fourth current sensor 41, and the third voltage sensor 42. The battery pack 100 also has a wiring substrate and a bus bar, though not shown. The wiring pattern of the wiring substrate and the bus bar form each of the first internal wire 11, the second internal wire 12, and the third internal wire 13 each mentioned above.

The change-over switch 20 and the BMU 30 are mounted on the wiring substrate described above. Thus, an electric circuit is configured. To the electric circuit, each of the lithium storage battery 10, the fourth current sensor 41, and the third voltage sensor 42 is electrically connected. The electric circuit is electrically connected to each of the first external connection terminal 100a, the second external connection terminal 100b, and the third external connection terminal 100c through the bus bar mentioned above. The electric circuit is also body-earthed through the bolt inserted in the fourth external connection terminal 100d.

The foregoing connection configuration allows the electric circuit mentioned above to be electrically connected to each of the lead storage battery 110, the starter motor 120, the rotary electric machine 130, the general load 150, the protected load 160, and the body of the vehicle. Note that at least a portion of each of the fourth current sensor 41 and the third voltage sensor 42 may form a portion of the electric circuit.

The battery pack 100 has a housing, which is not shown. The housing is produced by aluminum die casting. In the housing, the wiring substrate, the bus bar, the lithium storage battery 10, the change-over switch 20, the BMU 30, the fourth current sensor 41, and the third voltage sensor 42 each mentioned above are contained. The housing also performs the function of dissipating the heat generated in the lithium storage battery 10 or the electric circuit. The housing is provided under the seats in the vehicle. The fourth external connection terminal 100d mentioned above corresponds to the hole formed in the housing. The opening of the housing is covered with a cover made of a resin. This renders the electric circuit and the lithium storage battery 10 waterproof.

As described above, the example has been shown in which the change-over switch 20 is mounted on the wiring substrate. However, it is sufficient for the change-over switch 20 to be merely electrically connected to the wiring substrate, and the change-over switch 20 need not be directly mounted on the wiring substrate. In the case of this modification, the change-over switch 20 is mounted in the housing, for example. As a result, the change-over switch 20 is thermally connected to the housing. The heat generated in the change-over switch 20 positively flows to the housing, not to the wiring substrate. This promotes heat dissipation from the change-over switch 20.

The lithium storage battery 10 generates the electromotive voltage using a chemical reaction. The lithium storage battery 10 has the property of having an energy density higher than that of the lead storage battery 110. The lithium storage battery 10 has a size smaller than that of the lead storage battery 110 and a weight lighter than that of the lead storage battery 110. The lithium storage battery 10 has a plurality of series-connected battery cells. The lithium storage battery 10 is electrically connected to the wiring substrate through inner connection terminals. The lithium storage battery 10 corresponds to a second power source.

The change-over switch 20 has a first switch 21. The first switch 21 corresponds to a charge/discharge switch. As shown in FIG. 1, the first switch 21 and the lithium storage battery 10 are connected in series in the second internal wire 12. To a first middle point M1 between the first switch 21 and the lithium storage battery 10, the third internal wire 13 is connected. As a result, the protected load 160 is electrically connected to the first middle point M1.

Due to the foregoing connection configuration, when the first switch 21 is brought into an open state, the electrical connection between the lithium storage battery 10 and the first internal wire 11 is cut off. Specifically, the electrical connection between the lithium storage battery 10 and each of the lead storage battery 110, the starter motor 120, the rotary electric machine 130, and the general load 150 is cut off. However, the electrical connection between the lithium storage battery 10 and the protected load 160 is sustained. The first switch 21 is thus controlled into the open state when the lithium storage battery 10 is not charged.

Conversely, when the first switch 21 is brought into a closed state, the lithium storage battery 10 and the first internal wire 11 are electrically connected. As a result, the lithium storage battery 10 is electrically connected to each of the lead storage battery 110, the starter motor 120, the rotary electric machine 130, and the general load 150. Thus, the first switch 21 is controlled into the closed state when the lithium storage battery 10 is charged. In other words, the first switch 21 is controlled from the open state to the closed state when there is a request to charge the lithium storage battery 10 and the rotary electric machine 130 is in a power generating state. In the case of the present embodiment, to the conditions for the first switch 21 to be controlled into the closed state, the condition that the power generated by the rotary electric machine 130 can cover the total power requirement is added.

The amount of power required by the power source system 200 (system power requirement) is the total sum of the respective amounts of power required by the general load 150, the protected load 160, the lithium storage battery 10, and the lead storage battery 110. By contrast, the total power requirement described above is obtained by removing the amount of power required by the lead storage battery 110 from the system power requirement. In other words, the total power requirement is the total sum of the respective amounts of power required by the general load 150, the protected load 160, and the lithium storage battery 10.

When the lead storage battery 110 is in the discharged state, the amount of required power has a negative value. Accordingly, in this case, the total power requirement is higher than the system power requirement by the power supplied from the lead storage battery 110. On the other hand, when the lead storage battery 110 is in the charged stated, the amount of required power has a positive value. Accordingly, in this case, the total power requirement is lower than the system power requirement by the power used to charge the lead storage battery 110.

As described above, the in-vehicle devices which perform control, such as the BMU 30, the higher-level ECU 170, and the MGECU 180 are substantially included in the protected load 160. Consequently, the respective amounts of power required by these in-vehicle devices which perform control are also included in the system power requirement and the total power requirement each described above. The amounts of power required by the in-vehicle devices which perform control are stored as prescribed values in the higher-level ECU 170.

Note that the conditions for the first switch 21 to be controlled into the closed state also include the condition that the lithium storage battery 10 is in an excessively charged state. This is intended to forcibly accelerate the discharge of the lithium storage battery 10.

The BMU 30 is the abbreviation of "battery management unit". The BMU 30 in the present embodiment controls the change-over switch 20 to be opened or closed on the basis of a control instruction output from the higher-level ECU 170. Thus, the BMU 30 controls the charge/discharge of the lithium storage battery 10. The BMU 30 corresponds to a battery control unit. The BMU 30 and the higher-level ECU 170 form a power source control device.

The BMU 30 is electrically connected to each of the fourth current sensor 41 and the third voltage sensor 42. The BMU 30 calculates the electromotive voltage from the lithium storage battery 10 on the basis of respective outputs from these sensors. The BMU 30 stores the correlation between the electromotive voltage from the lithium storage battery 10 and the SOC. The BMU 30 calculates the SOC of the lithium storage battery 10 from the calculated electromotive voltage and the stored correlation. In other words, the BMU 30 calculates the amount of power required by the lithium storage battery 10. The BMU 30 transmits the amount of power required by the lithium storage battery 10 to the higher-level ECU 170.

Note that the battery pack 100 has a temperature sensor which detects the temperature of the lithium storage battery 10. The BMU 30 is electrically connected to the temperature sensor. The electromotive voltage from the lithium storage battery 10 changes in accordance also with temperature. Accordingly, in calculating the electromotive voltage, the BMU 30 also additionally uses a detection signal from the temperature sensor.

Figure 2:
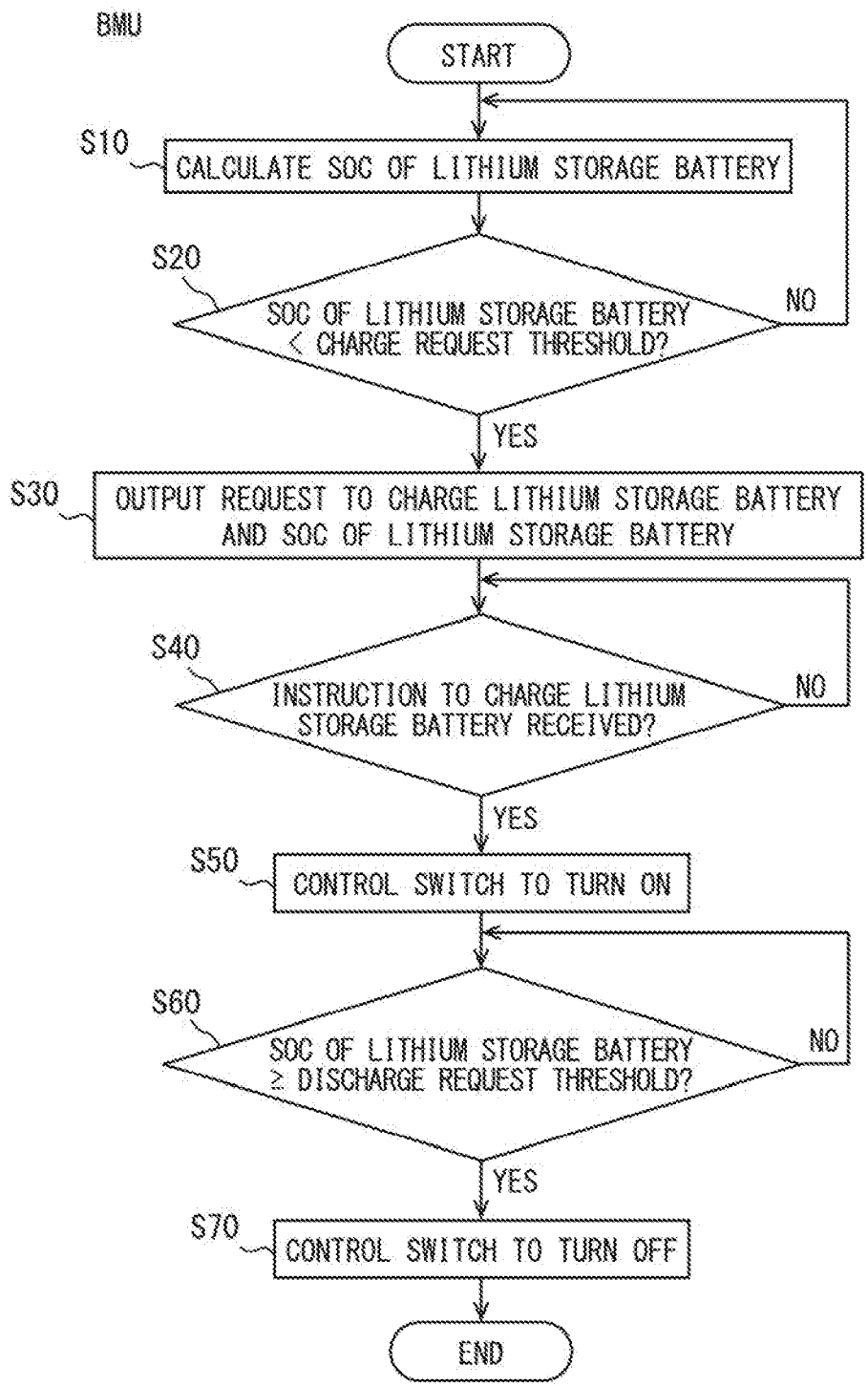
FIG. 2 is a flow chart for illustrating a charge process by a BMU.
Figure 3:
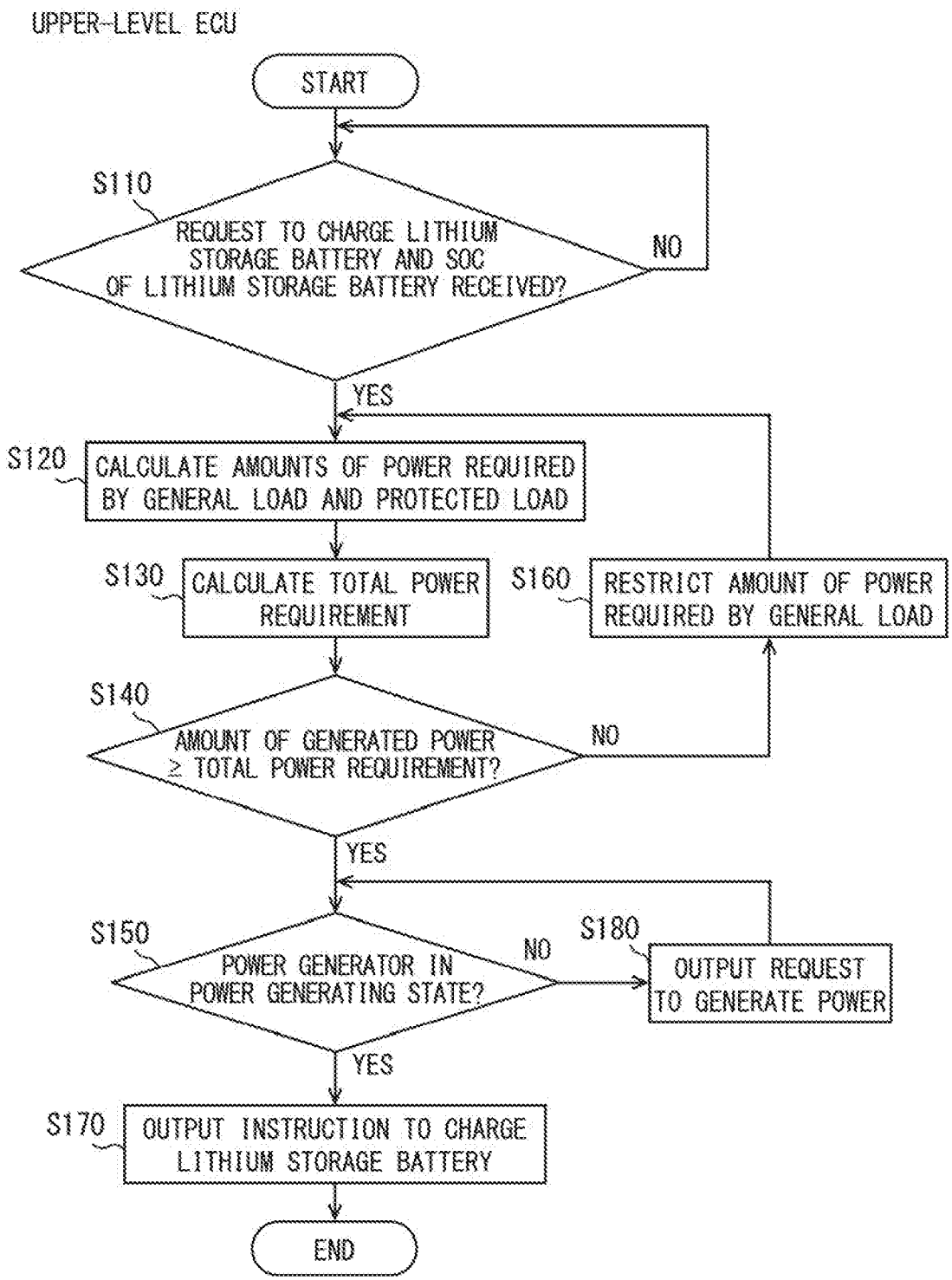
FIG. 3 is a flow chart for illustrating a charge process by a higher-level ECU.

Next, on the basis of FIGS. 2 and 3, a charge process for the lithium storage battery 10 will be described. The BMU 30 and the higher-level ECU 170 communicate with each other to perform the charge process for the lithium storage battery 10. FIG. 2 is a flow chart for illustrating a charge process by the BMU 30. FIG. 3 is a flow chart for illustrating a charge process by the higher-level ECU 170.

In S10 shown in FIG. 2, the BMU 30 first calculates the SOC of the lithium storage battery 10. Then, the BMU 30 advances to S20.

The BMU 30 that has advanced to S20 determines whether or not the SOC of the lithium storage battery 10 is less than a charge request threshold. The BMU 30 stores, as thresholds for determining the SOC of the lithium storage battery 10, a minimum threshold, the charge request threshold, a discharge request threshold, and a maximum threshold in order of increasing value. The range in which the lithium storage battery 10 is usable in a normal state is between the minimum threshold and the maximum threshold. When the SOC becomes less than the minimum threshold, the lithium storage battery 10 may be excessively discharged. When the SOC exceeds the maximum threshold, the lithium storage battery 10 may be excessively charged. The charge request threshold is a value for determining that the SOC of the lithium storage battery 10 is close to the minimum threshold. The discharge request threshold is a value for determining that the SOC of the lithium storage battery 10 is close to the maximum threshold.

When the SOC of the lithium storage battery 10 is equal to or more than the charge request threshold, the BMU 30 determines that the lithium storage battery 10 need not be charged, and returns to S10. On the other hand, when the SOC of the lithium storage battery 10 is less than the charge request threshold, the BMU 30 determines that the lithium storage battery 10 needs to be charged, and advances to S30.

The BMU 30 that has advanced to S30 outputs a request to charge the lithium storage battery 10 to the higher-level ECU 170. The BMU 30 also outputs the SOC of the lithium storage battery 10 to the higher-level ECU 170. Then, the BMU 30 advances to S40.

The BMU 30 that has advanced to S40 determines whether or not an instruction to charge the lithium storage battery 10 as a response signal from the higher-level ECU 170 to the request to charge the lithium storage battery 10 is received. The BMU 30 repeats S40 until the charge instruction is received, resulting in a standby state. On receiving the charge instruction, the BMU 30 advances to S50.

The BMU 30 that has advanced to S50 performs control to turn ON the change-over switch 20. Specifically, the BMU 30 outputs a control signal to the first switch 21. This brings the first switch 21 from the open state into the closed state. As a result, the lithium storage battery 10 is electrically connected to the rotary electric machine 130 to charge the lithium storage battery 10. Then, the BMU 30 advances to S60.

The BMU 30 that has advanced to S60 determines whether or not the SOC of the lithium storage battery 10 is equal to or more than the discharge request threshold. When the SOC of the lithium storage battery 10 is less than the discharge request threshold, the BMU 30 determines that the lithium storage battery 10 needs to be charged, and repeats S60. When the SOC of the lithium storage battery 10 is equal to or more than the discharge request threshold, the BMU 30 determines that the lithium storage battery 10 needs to be discharged, and advances to S70.

The BMU 30 that has advanced to S70 performs control to turn OFF the change-over switch 20. Specifically, the BMU 30 stops outputting the control signal to the first switch 21. This brings the first switch 21 into the open state. As a result, the electrical connection between the lithium storage battery 10 and the rotary electric machine 130 is cut off. The BMU 30 that has finished performing the foregoing process ends the charge process for the lithium storage battery 10. The BMU 30 returns again to S10 and repeats the charge process.

By constantly performing S10 and S20, the BMU 30 determines the request to charge the lithium storage battery 10. Note that, in S10, the BMU 30 compares the SOC of the lithium storage battery 10 with each of the minimum threshold, the charge request threshold, the discharge request threshold, and the maximum threshold which are mentioned above. Thus, the BMU 30 determines the state of the lithium storage battery 10. The result of the determination is transmitted to the higher-level ECU 170.

Next, the charge process for the lithium storage battery 10 performed by the higher-level ECU 170 will be described on the basis of FIG. 3.

In S110 shown in FIG. 3, the higher-level ECU 170 determines whether or not the request to charge the lithium storage battery 10 from the BMU 30 is received. The higher-level ECU 170 repeats S110 until the charge request is received, resulting in a standby state. On receiving the charge request, the higher-level ECU 170 advances to S120. The charge request is output by the BMU 30 to the higher-level ECU 170 in S30 of the charge process shown in FIG. 2.

The higher-level ECU 170 that has advanced to S120 calculates the respective amounts of power required by the general load 150 and the protected load 160. Then, the higher-level ECU 170 advances to S130.

When the respective amounts of power required by the general load 150 and the protected load 160 are considered to be equal to the power usage, the calculation of the respective amounts of power required by the general load 150 and the protected load 160 can be performed by multiplying the second current by the first voltage. Alternatively, it is also possible to estimate and calculate the respective amounts of power required by the general load 150 and the protected load 160 on the basis of a vehicle control state and the power usage. Still alternatively, it is also possible to acquire the respective amounts of required power used for actual control of the general load 150 and the protected load 160 from the various ECUs which are controlling the general load 150 and the protected load 160 and thus calculate the respective amounts of power required by the general load 150 and the protected load 160. Note that, in the case of the mode in which the higher-level ECU 170 controls each of the general load 150 and the protected load 160, the higher-level ECU 170 reads the amounts of the required power which are generated by the higher-level ECU 170.

The higher-level ECU 170 that has advanced to S130 adds up the received SOC of the lithium storage battery 10 and the calculated amounts of power required by the general load 150 and the protected load 160. The higher-level ECU 170 also adds, to the resulting sum, the amount of power required by an in-vehicle device that performs control, which is stored as a prescribed value. Thus, the higher-level ECU 170 calculates the total power requirement. Then, the higher-level ECU 170 advances to S140.

From the MGECU 180 to the higher-level ECU 170, the amount of power generated by the rotary electric machine 130 is constantly transmitted. Consequently, the higher-level ECU 170 that has advanced to S140 determines whether or not the amount of power generated by the rotary electric machine 130, which is transmitted from the MGECU 180, is equal to or more than the total power requirement calculated in S130. When the amount of generated power is equal to or more than the total power requirement, the higher-level ECU 170 advances to S150. Conversely, when the amount of generated power is lower than the total power requirement, the higher-level ECU 170 advances to S160.

Note that, as described above, when the lead storage battery 110 is in the discharged state, the total power requirement is higher than the system power requirement by the power supplied from the lead storage battery 110. Consequently, when the condition that the amount of generated power is larger than the total power requirement is satisfied in S140, even though the power supply from the lead storage battery 110 fails at this time, the amount of generated power can solely cover the entire amount of power required by the power source system 200.

The higher-level ECU 170 that has advanced to S150 determines whether or not the rotary electric machine 130 is in the power generating state. When the rotary electric machine 130 is in the power generating state, the higher-level ECU 170 advances to S170. Conversely, when the rotary electric machine 130 is not in the power generating state, the higher-level ECU 170 advances to S180.

The higher-level ECU 170 that has advanced to S170 outputs an instruction to charge the lithium storage battery 10 to the BMU 30. The higher-level ECU 170 that has finished performing the foregoing process ends the charge process for the lithium storage battery 10.

Going back slightly in the flow, when the higher-level ECU 170 determines that the rotary electric machine 130 is not in the power generating state in S150 and advances to S180, the higher-level ECU 170 outputs, to the MGECU 180, a request for power generation by the rotary electric machine 130. Then, the higher-level ECU 170 returns to S150. Thus, the higher-level ECU 170 repeats S150 and S180 until the rotary electric machine 130 is brought into the power generating state.

Going back in the flow, when determining that the amount of generated power is equal to or less than the total power requirement in S140 and advancing to S160, the higher-level ECU 170 controls the amount of power required by the general load 150. The higher-level ECU 170 determines the degree of restriction of the amount of power required by the general load 150 on the basis of the difference value between the total power requirement and the available power amount. The restriction of the power required by the general load 150 is specifically performed through the outputting of a restriction request by the higher-level ECU 170 to the ECU which is controlling the driving of the general load 150. Note that, when the higher-level ECU 170 controls the driving of the general load 150, the higher-level ECU 170 directly controls the amount of power required by the general load 150.

As described above, the examples of the general load 150 include a seat heater, a blast fan, an electric compressor, a room light, and headlights. The higher-level ECU 170 performs, e.g., the restriction of the amount of heat generated by the seat heater, the restriction of the amount of blast from the blast fan, the inhibition of the operation thereof, or the like. The higher-level ECU 170 also performs, e.g., the restriction of an output from the room light or the headlights.

To perform the restriction, when an output range is assumed to include, e.g., output levels 5 to 1 given in descending order, the output level which is originally set to 5 is set to, e.g., 2. There is a method which thus restricts the maximum value of the amount of usable power to restrict the amount of required power. There is also a method which simply reduces the value required by the power usage. By appropriately combining these two methods, the amount of required power can be restricted.

As shown above, after restricting the amount of power required by the general load 150, the higher-level ECU 170 returns to S120. Then, the higher-level ECU 170 performs Step 130 and S140 again. In that case also, on determining that the amount of generated power is lower than the total power requirement, the higher-level ECU 170 advances again to S160 and further controls the amount of power required by the general load 150. Thus, the higher-level ECU 170 repeats S120 to S140 and S160 until the amount of generated power is larger than the total power requirement.

As described above, the general load 150 includes those having various functions, and the general loads 150 having the various functions differ in the degree of association with vehicle running. On the basis of the different degrees of association, the higher-level ECU 170 determines priorities in restricting the amount of required power. Specifically, the restriction of the power required by the general load 150, which is remotely associated with vehicle running, is preferentially performed. By way of example, it can be determined that the seat heater, the blast fan, the electric compressor, the room light, and the headlights have progressively lower priorities.

When the restriction of the amount of required power can be achieved by restricting the amount of power generated by the seat heater, the higher-level ECU 170 does not limit the amounts of power required by the other general loads 150. However, when the restriction of the amount of required power cannot be achieved even by restricting the amount of heat generated by the seat heater, the higher-level ECU 170 performs not only the restriction of the amount of power generated by the seat heater, but also the restriction of the amount of blast from the blast fan or the inhibition of the operation thereof, the restriction of the operation of the electric compressor, and the inhibition of the operation thereof. When even this cannot achieve the restriction of the amount of required power, the higher-level ECU 170 performs not only the restriction of outputs of the seat heater, the blast fan, and the electric compressor, but also the restriction of an output from the room light. Finally, when even this cannot achieve the restriction of the amount of required power, the higher-level ECU 170 performs the restriction of an output from the headlights.

Note that, when the wipers are among the general loads 150, the higher-level ECU 170 performs the restriction of the operating speed of the wipers. The priority of the amount of power required by the wipers is equal to that of the headlights.

Next, on the basis of FIG. 4, a failsafe process performed by the higher-level ECU 170 will be described. The failsafe process is performed while the charge process for the lithium storage battery 10 shown in FIG. 3 is performed.

Figure 4:
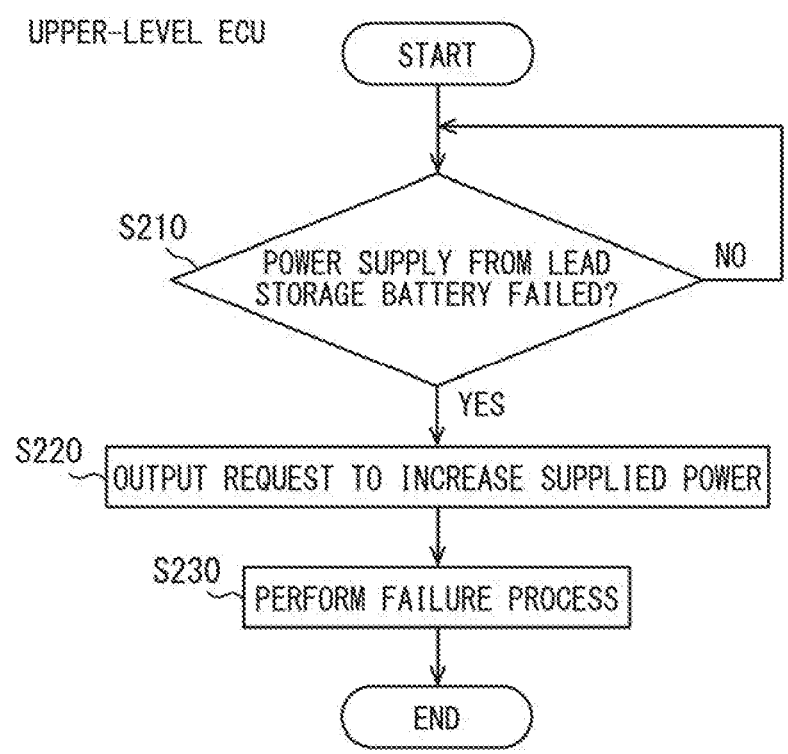
FIG. 4 is a flow chart for illustrating a failsafe process by the higher-level ECU.

In S210 shown in FIG. 4, the higher-level ECU 170 determines whether or not the power supply from the lead storage battery 110 has failed. When a power supply failure is not detected, the higher-level ECU 170 repeats S210, resulting in a standby state. When a power supply failure is detected, the higher-level ECU 170 advances to S220.

The presence or absence of a failure in power supply from the lead storage battery 110 can be determined by, e.g., comparing the respective voltages detected by the first voltage sensor 195 and the second voltage sensor 196 with each other. It is expected that the first voltage detected by the first voltage sensor 195 is equal to the second voltage detected by the second voltage sensor 196 when a voltage drop due to wiring resistance or connection resistance is removed therefrom. Accordingly, when the absolute value of the difference value between the first voltage and the second voltage is larger than the voltage drop mentioned above, it can be determined that the power supply from the lead storage battery 110 has failed. It is also possible to more simply determine a failure in power supply from the lead storage battery 110 on the basis of whether or not the third current detected by the third current sensor 193 is zero.

As described above, the Pb terminal 111 of the lead storage battery 110 is mechanically and electrically connected with a bolt to the one end of one of the plurality of wire harnesses included in the first wire 201. Fastening with the bolt may be loosened by the vibration of the vehicle. This may electrically disconnect the first wire 201 from the lead storage battery 110 and cause a power supply failure. The degree of the bolt fastening can be adjusted by the user of the vehicle. Accordingly, when the bolt fastening by the user of the vehicle is loose, it may also be possible that the first wire 201 is electrically disconnected from the lead storage battery 110 and the power supply fails. Since such a situation is assumed, as described above, the higher-level ECU 170 determines a failure in power supply from the lead storage battery 110.

The higher-level ECU 170 that has advanced to S220 outputs, to the MGECU 180, a request to increase the power supplied from the rotary electric machine 130. Then, the higher-level ECU 170 advances to S230.

As described above, to the rotary electric machine 130, the regulator is connected. The regulator feedback-controls a supply of the generated voltage to the battery pack 100 such that the voltage value between the rotary electric machine 130 and the battery pack 100 is equal to the value of the required voltage output from the MGECU 180. When the power supply from the lead storage battery 110 fails, the voltage value between the rotary electric machine 130 and the battery pack 100 decreases. Accordingly, the regulator supplies the generated voltage to the battery pack 100 such that voltage variation stops before receiving, from the MGECU 180, an instruction to increase the supplied power based on the power supply request from the higher-level ECU 170.

As shown above, when the regulator is connected to the rotary electric machine 130, the higher-level ECU 170 needs not perform S220. However, by performing S220, it is possible to impart redundancy to the stability of the voltage.

The higher-level ECU 170 that has advanced to S230 performs a failure process. Then, the higher-level ECU 170 ends the failsafe process.

Specifically, the failure process includes the following process of, i.e., giving a notification to the vehicle user by lighting up an abnormality lamp provided in the instrumental panel and restricting the amount of power required by the general load 150. The failure process also includes ensuring a power supply to the protected load 160 by fixing the driving range of the vehicle to a parking range and fixing the first switch 21 to the open state when a vehicle stop is recognized. The failure process also includes inhibiting an idling stop. Note that the amount of power required by the general load 150 is restricted to a level which allows the engine 140 to be driven.

Next, on the basis of FIG. 5, the breakdown of the power source system 200 resulting from defective connection of the Pb terminal 111 will be described as a reference example. In the reference example, unlike in the power source system 200 in the present embodiment, the amount of power required by the general load 150 is not restricted. Note that, to clearly show the difference between the amounts of power, as the power generation amount of the rotary electric machine 130, the amount of actually generated power, the amount of available power that can be generated, and the system power requirement are respectively shown by the solid line, the two-dot-dash line, and the dot-dash line in overlapping relation.

At a time t1, the SOC of the lithium storage battery 10 is between the discharge request threshold and the charge request value. Accordingly, the BMU 30 has not output a charge request to the higher-level ECU 170.

The lithium storage battery 10 is discharged. The lead storage battery 110 is also discharged. Consequently, the respective amounts of power required by the lithium storage battery 10 and the lead storage battery 110 have negative values. In FIG. 5, the discharged state of the lead storage battery 110 is shown by the negative range.

The rotary electric machine 130 is in the power generating state. The amount of power generated by the rotary electric machine 130 is equal to the available power amount. The system power requirement is larger than the amount of generated power. The difference between the system power requirement and the amount of generated power is compensated for by the respective amounts of power supplied from the lead storage battery 110 and the lithium storage battery 10.

The first switch 21 is in the open state. Consequently, the lithium storage battery 10 is connected only to the protected load 160. The voltage supplied to the protected load 160 is constant and more than a reset voltage. Accordingly, the protected load 160 is in the ON state. The BMU 30 is similarly in the ON state. The battery pack 100 is in the operating state. To the protected load 160, power is supplied from each of the lead storage battery 110, the lithium storage battery 10, and the rotary electric machine 130.

When time elapses from the time t1, as a result of power supply to the protected load 160, the SOC of the lithium storage battery 10 decreases.

When a time t2 is reached, the SOC of the lithium storage battery 10 is less than the charge request threshold. On detecting the SOC of the lithium storage battery 10 less than the charge request threshold, the BMU 30 outputs a charge request to the higher-level ECU 170.

On receiving the charge request, the higher-level ECU 170 outputs a charge instruction to the BMU 30. Between the reception of the charge request by the higher-level ECU 170 and the outputting of the charge instruction from the higher-level ECU 170, there is a response delay. The response delay corresponds to the period between the time t2 and a time t3 in FIG. 5.

When the time t3 is reached, the BMU 30 receives the charge instruction. In accordance with the charge instruction, the BMU 30 controls the first switch 21 into the closed state. To shift from the open state to the closed state, the first switch 21 needs a transition time. However, in FIG. 5, the transition time is omitted.

When the first switch 21 has shifted to the closed state, the lithium storage battery 10 is electrically connected to the rotary electric machine 130. As a result, the rotary electric machine 130 also performs a power supply to the lithium storage battery 10. Due to the power supply to the lithium storage battery 10, the voltage supplied to the protected load 160 slightly decreases.

As described above, to the rotary electric machine 130, the regulator is connected to perform feedback control such that the output voltage is constant. However, the amount of power generated by the rotary electric machine 130 is originally equal to the available power amount. Accordingly, even when the voltage supplied to the protected load 160 slightly decreases, the voltage supplied to the protected load 160 can no longer be held at the original voltage level by the feedback control by the regulator.

Due to the power supply from the rotary electric machine 130, the SOC of the lithium storage battery 10 gradually increases. Eventually, the SOC of the lithium storage battery 10 exceeds the charge request threshold. However, at a time t4 before the SOC of the lithium storage battery 10 exceeds the discharge request threshold, the Pb terminal 111 is electrically disconnected. As a result, the power supply from the lead storage battery 110 is interrupted so that the voltage supplied to the protected load 160 further decreases.

When a time t5 is reached, the voltage supplied to the protected load 160 becomes less than the reset voltage. This brings the protected load 160 into the OFF state. As a result, the BMU 30 is also brought into the OFF state, while the first switch 21 is brought into the open state. The charge request output is interrupted, and the battery pack 100 is also brought into the OFF state. Then, the power source system 200 is also brought into the OFF state, and the power generation by the rotary electric machine 130 is also stopped. As shown above, when the Pb terminal 111 is electrically disconnected, the power source system 200 may break down.

Next, on the basis of FIG. 6, the charge process for the power source system 200 according to the present embodiment will be described. Note that, in FIG. 6, in the same manner as in FIG. 5, the lead storage battery 110 is in the discharged state. As a result, when there is no discharge of (no power supply from) the lead storage battery 110, the system power requirement is accordingly increased.

Figure 5:
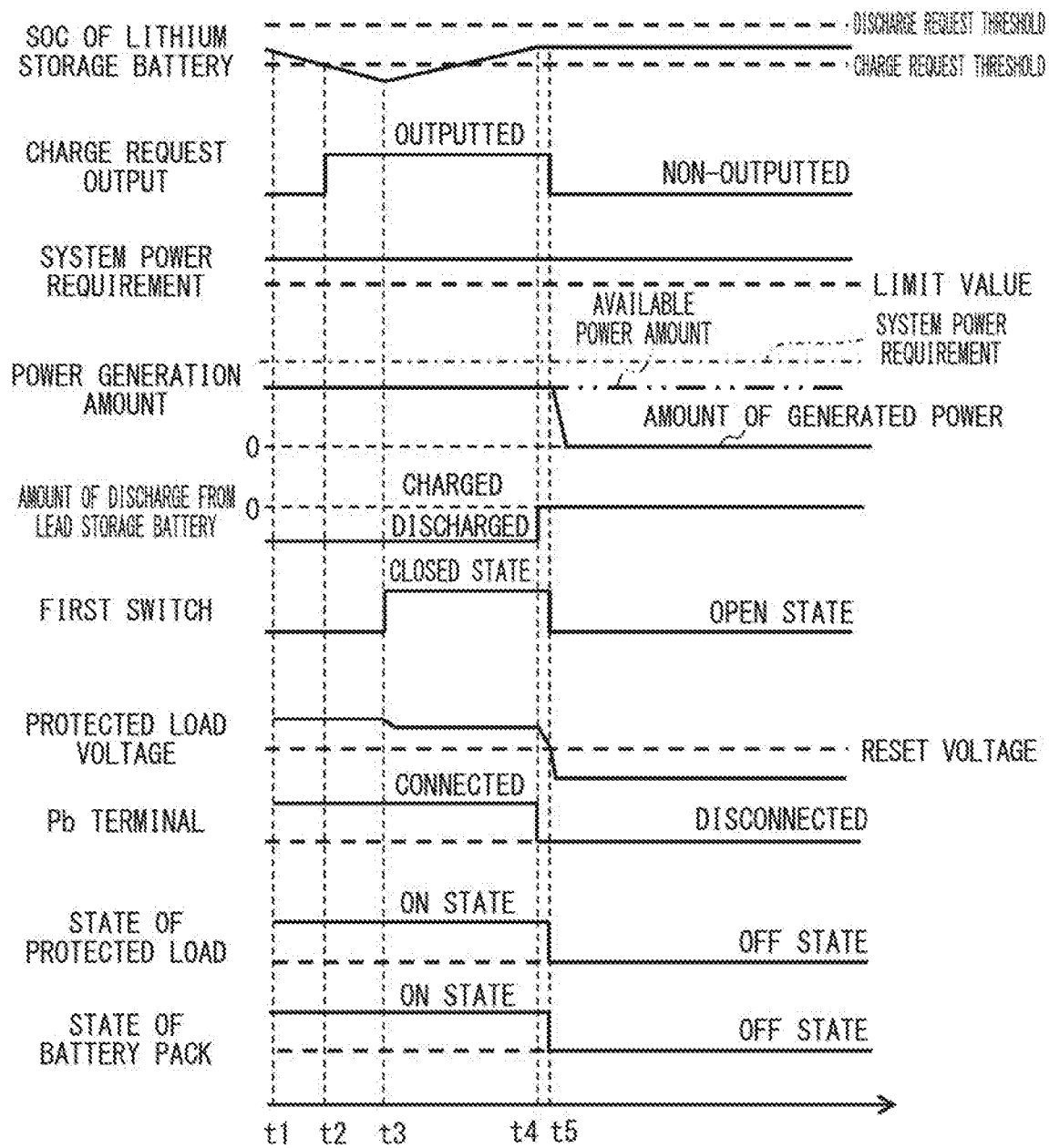
FIG. 5 is a timing chart for illustrating the breakdown of a power source system due to defective connection of a Pb terminal.
Figure 6:
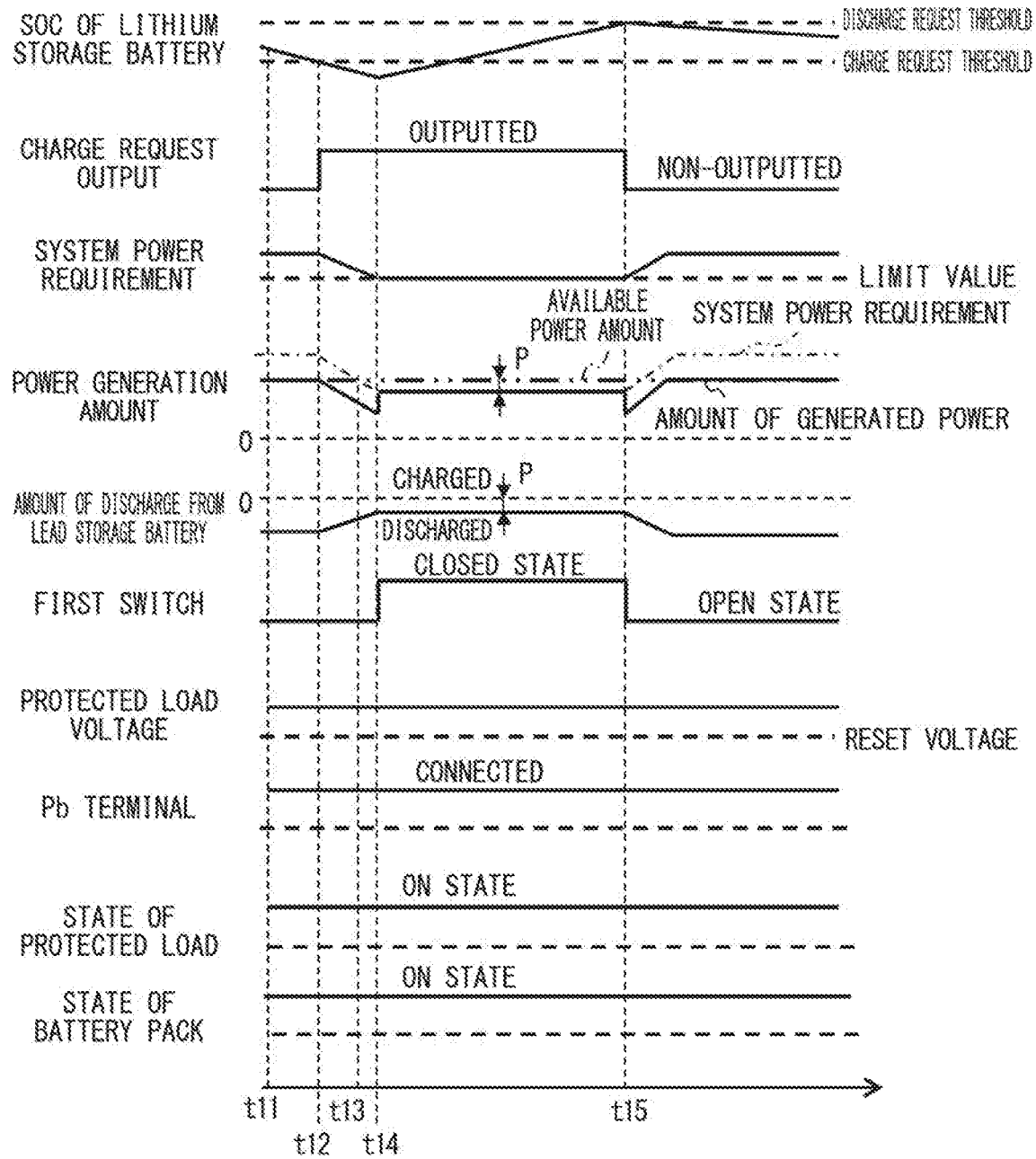
FIG. 6 is a timing chart for illustrating a charge process.

The state of the power source system 200 at a time t11 shown in FIG. 6 is the same as the state of the power source system 200 at the time t1 shown in FIG. 5. Also, the behavior of the power source system 200 between the time t11 and a time t12 each shown in FIG. 6 is the same as the behavior of the power source system 200 between the time t1 and the time t2 each shown in FIG. 5. Therefore, a description of the state and the behavior of the power source system 200 is omitted.

At the time t12, the SOC of the lithium storage battery 10 becomes less than the charge request threshold. On detecting the SOC of the lithium storage battery 10 less than the charge request threshold, the BMU 30 outputs a charge request to the higher-level ECU 170.

On receiving the charge request, the higher-level ECU 170 calculates the total power requirement and compares the calculated total power requirement with the amount of generated power. As shown in FIG. 6, the amount of generated power is less than the system power requirement. Needless to say, the amount of generated power is also less than the total power requirement. Consequently, the higher-level ECU 170 starts to restrict the amount of power required by the general load 150. As a result, the system power requirement (total power requirement) starts to gradually decrease. In response thereto, each of the power generation amount of the rotary electric machine 130 and the amount of discharge from the lead storage battery 110 gradually decreases so as to achieve balance between the amount of consumed power and the amount of supplied power.

When a time t13 is reached, the system power requirement is equal to the available power amount. However, the system power requirement is less than the total power requirement by the power supplied from the lead storage battery 110. Accordingly, when the power supply from the lead storage battery 110 is interrupted, by merely restricting the amount of required power at this time, the total power requirement cannot be covered only by the amount of power generated by the rotary electric machine 130. Accordingly, the higher-level ECU 170 further reduces the system power requirement by the power supplied from the lead storage battery 110.

When a time t14 is reached, the system power requirement is lower than the system power requirement at the time t13 by the power supplied from the lead storage battery 110. As a result, the system power requirement when the power supply from the lead storage battery 110 is interrupted is equal to the available power amount. In other words, the total power requirement is equal to the available power amount. At this time, the higher-level ECU 170 outputs a charge instruction to the BMU30.

On receiving the charge instruction, the BMU 30 controls the first switch 21 into the closed state. When the first switch 21 is in the closed state, the lithium storage battery 10 is electrically connected to the rotary electric machine 130. As a result, the rotary electric machine 130 also performs power supply to the lithium storage battery 10. At this time, due to a reduction in the amount of power generated by the rotary electric machine 130 resulting from the restriction of the system power requirement described above, the amount of generated power is less than the available power amount. Accordingly, even when the amount of consumed power is increased by the power supply to the lithium storage battery 10, it is also possible to increase the power generation amount of the rotary electric machine 130. As shown in FIG. 6, with the increase of the amount of consumed power resulting from the power supply to the lithium storage battery 10, the amount of power generated by the rotary electric machine 130 also increases. As a result, the voltage supplied to the protected load 160 is held constant.

As described above, the amount of power generated by the rotary electric machine 130 is increased, and the increased amount of generated power surpasses the available power amount. The surplus corresponds to the amount of power supplied from the lead storage battery 110. In FIG. 6, the surplus is represented by the symbol P. As a result, even when the Pb terminal 111 is electrically disconnected at this time and the power supply from the lead storage battery 110 is interrupted, the power generated by the rotary electric machine 130 can compensate for the loss.

At the time t14 and thereafter, the SOC of the lithium storage battery 10 is gradually increased by the power supply from the rotary electric machine 130. When a time t15 is reached, the SOC of the lithium storage battery 10 exceeds the discharge request threshold. On detecting the SOC of the lithium storage battery 10 exceeding the charge request threshold, the BMU 30 stops the outputting of the charge request to the higher-level ECU 170 and controls the first switch 21 into the open state. On sensing the stop of the outputting of the charge request, the higher-level ECU 170 removes the restriction of the amount of power required by the general load 150. As a result, the system power requirement gradually increases. Consequently, the amount of power generated by the rotary electric machine 130 and the amount of discharge from the lead storage battery 110 gradually increase. Note that, between the detection of the stop of the outputting of the charge request by the higher-level ECU 170 and the removal of the restriction of the amount of power required by the general load 150, there is a response delay. However, in FIG. 6, the illustration of the response delay is omitted.

Next, on the basis of FIG. 7, a behavior of the voltage supplied to the protected load 160 when the Pb terminal 111 is electrically disconnected while the lithium storage battery 10 is charged will be described. Note that the higher-level ECU 170 of the power source system 200 shown in FIG. 7 does not perform S220 shown in FIG. 4. In addition, the feedback control of the output voltage by the regulator connected to the rotary electric machine 130 for providing the constant output voltage is not performed, either. For ease of description, the execution of S220 and the feedback control is omitted. The execution of S220 and the feedback control will be individually described later on the basis of FIGS. 8 and 9.

Figure 7:
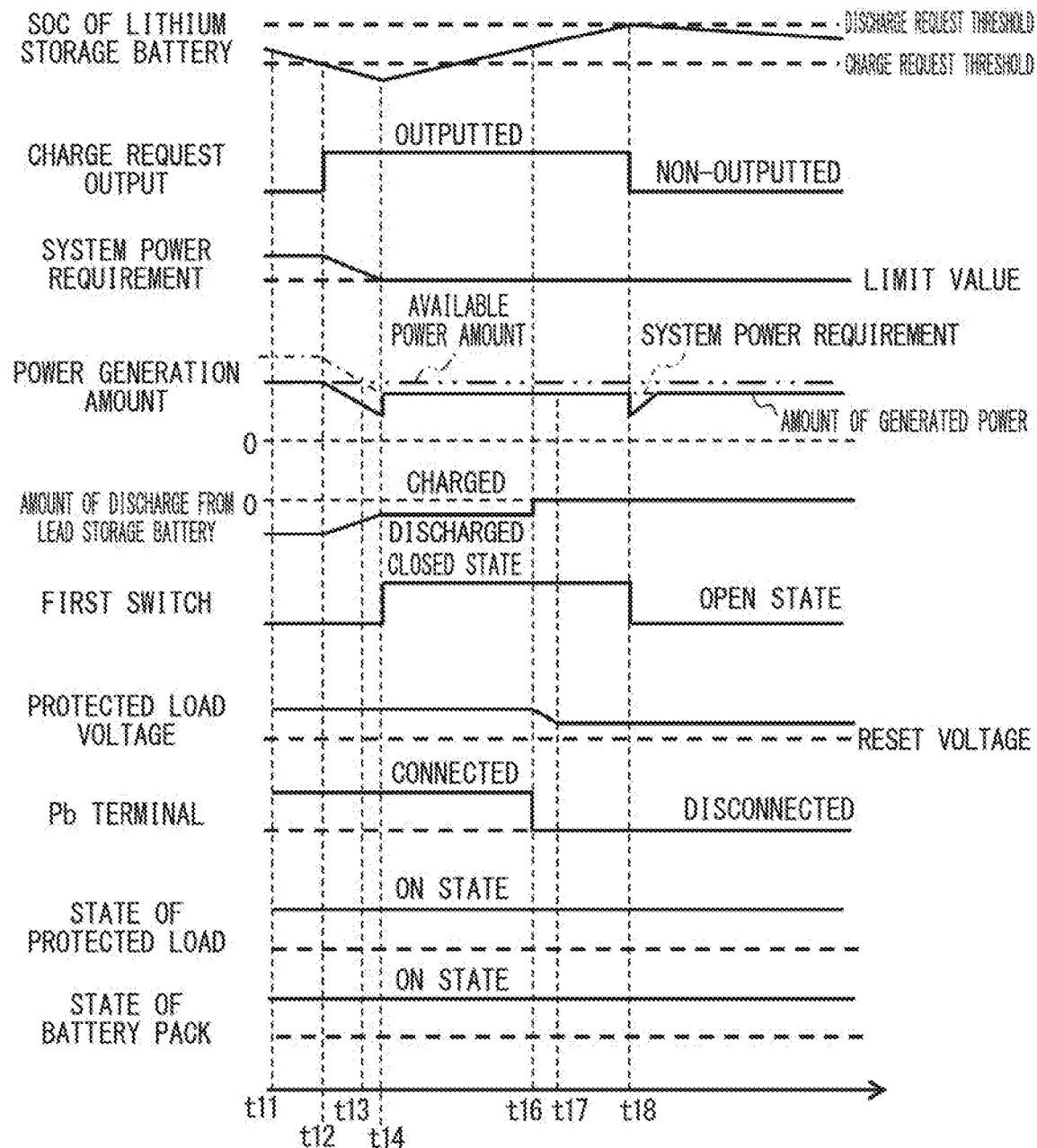
FIG. 7 is a timing chart for illustrating a failsafe process in the event of the defective connection of the Pb terminal.

The behavior of the power source system 200 between the time t11 and the time t14 shown in FIG. 7 is the same as the behavior of the power source system 200 between the time t11 and the time t14 shown in FIG. 6. Therefore, a description thereof is omitted.

At a time t16, the Pb terminal 111 is electrically disconnected. As a result, the power supply from the lead storage battery 110 is interrupted so that the voltage supplied to the protected load 160 decreases.

However, the lowering of the voltage supplied to the protected load 160 stops at a time t17. The voltage supplied at this time is larger than the reset threshold. This is because, even when the power supply from the lead storage battery 110 fails due to the restriction of the amount of power required by the general load 150, the power supply from the rotary electric machine 130 can cover the system power requirement (total power requirement).

When a time t18 is reached, the SOC of the lithium storage battery 10 exceeds the discharge request threshold. On detecting the SOC of the lithium storage battery 10 exceeding the discharge request threshold, the BMU 30 stops the outputting of the charge request to the higher-level ECU 170 and controls the first switch 21 into the open state. Since the failure in power supply to the lead storage battery 110 is detected, even when the higher-level ECU 170 senses the stop of the outputting of the charge request, the higher-level ECU 170 continues to restrict the amount of power required by the general load 150.

Note that, on the basis of FIG. 4, the failsafe process by the higher-level ECU 170 has been described. In the failsafe process, when it is determined that the power supply from the lead storage battery 110 has failed, the open state of the first switch 21 is fixed by way of example. When the failsafe process is performed, at the time t16 in FIG. 7, the first switch 21 is fixed to the open state. However, as shown in FIG. 7, it may also be possible to fix the first switch 21 to the open state after the SOC of the lithium storage battery 10 exceeds the discharge request threshold. This can restrict a situation in which the power supplied from the lithium storage battery 10 to the protected load 160 becomes insufficient due to the insufficient charging of the lithium storage battery 10.

Next, on the basis of FIG. 8, the recovery of the voltage supplied to the protected load 160 due to the feedback control by the regulator will be described.

Figure 8:
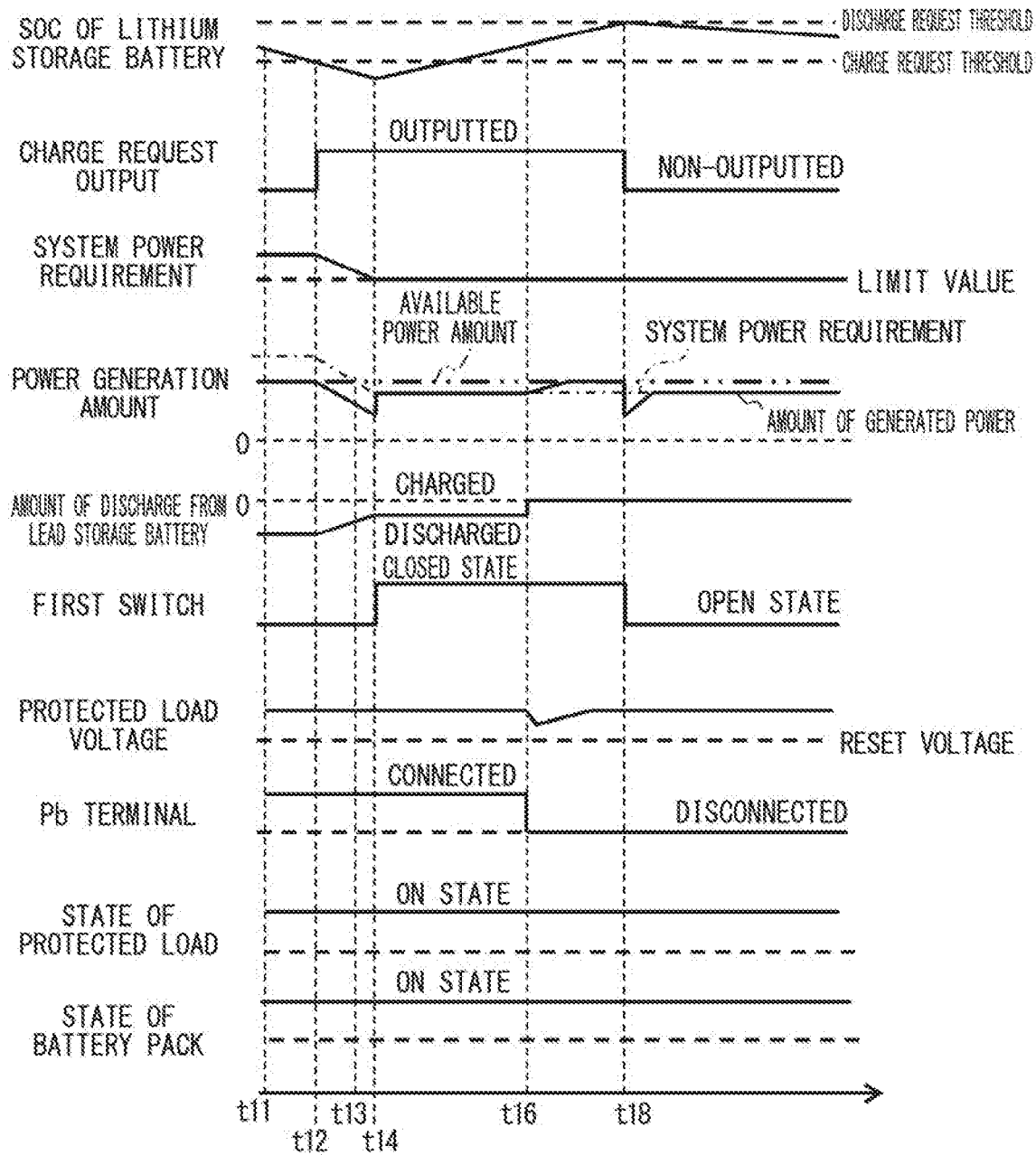
FIG. 8 is a timing chart for illustrating an increase in power generation amount caused by a regulator in the event of the defective connection of the Pb terminal.

The behavior of the power source system 200 between the time t11 and the time t16 shown in FIG. 8 is the same as the behavior of the power source system 200 between the time t11 and the time t16 shown in FIG. 7. Accordingly, a description thereof is omitted.

At the time t16, the Pb terminal 111 is electrically disconnected. As a result, the power supply from the lead storage battery 110 is interrupted so that the voltage supplied to the protected load 160 decreases. At this time, the voltage between the rotary electric machine 130 and the battery pack 100 also decreases. In response thereto, the regulator controls the supply of the voltage generated by the rotary electric machine 130 to the battery pack 100 so as to allow the voltage to recover to the original voltage level. As a result, as shown in FIG. 8, the voltage supplied to the protected load 160 recovers to the original voltage level. Due to the feedback control by the regulator, the recovery of the voltage level of the supplied voltage caused by the regulator is more responsive than in the failsafe process by the higher-level ECU 170.

Next, on the basis of FIG. 9, the recovery of the voltage supplied to the protected load 160 due to the failsafe process by the higher-level ECU 170 will be described.

Figure 9:
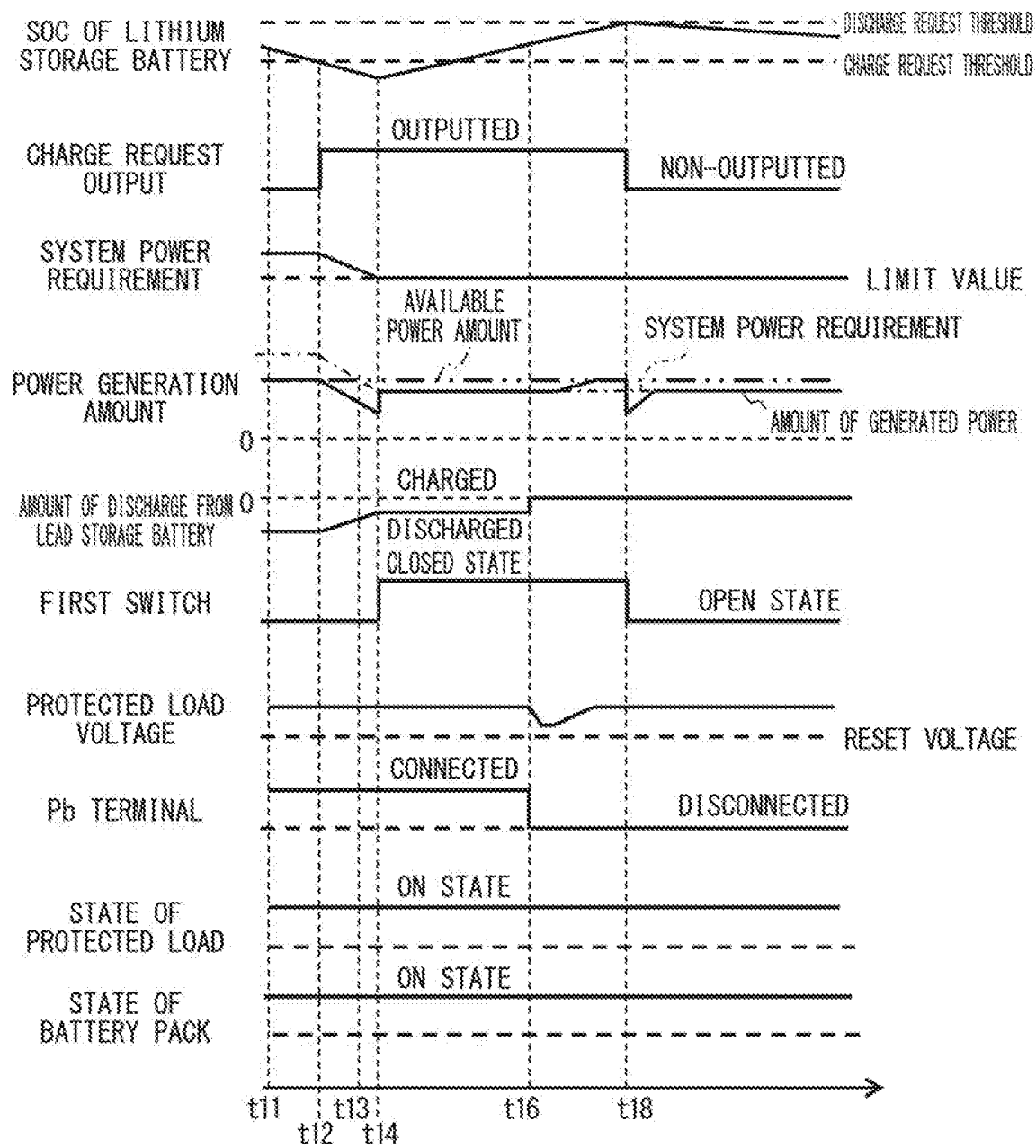
FIG. 9 is a timing chart for illustrating an increase in power generation amount caused by the higher-level ECU in the event of the defective connection of the Pb terminal.

The behavior of the power source system 200 between the time t11 and the time t16 shown in FIG. 9 is the same as the behavior of the power source system 200 between the time t11 and the time t16 shown in FIG. 7. Accordingly, a description thereof is omitted.

At the time t16, the Pb terminal 111 is electrically disconnected. As a result, the power supply from the lead storage battery 110 is interrupted so that the voltage supplied to the protected load 160 decreases. On sensing the decrease of the voltage supplied to the protected load 160, the higher-level ECU 170 outputs a request to increase the power supplied from the rotary electric machine 130. Consequently, as shown in FIG. 9, the voltage supplied to the protected load 160 recovers to the original voltage level. The recovery of the voltage level of the supplied voltage in response to the request to increase the supplied power from the higher-level ECU 170 to the MGECU 180 has a response delay. However, as described on the basis of FIG. 7, even when the power supply from the lead storage battery 110 fails due to the restriction of the system power requirement, it is arranged that the power supply from the rotary electric machine 130 covers the system power requirement (total power requirement). Accordingly, even when a delay occurs in the recovery of the voltage level of the supplied voltage, the supplied voltage is restricted from being less than the reset threshold.

Next, the functions and effects of the battery pack according to the present embodiment and the power source system 200 including the battery pack 100 will be described.

As described for the charge process, when the rotary electric machine 130 is in the power generating state, the lithium storage battery 10 is in a charge requesting state, and the amount of power generated by the rotary electric machine 130 is equal to or more than the total power requirement, the power source system 200 brings the first switch 21 into the closed state. As a result, even when the lead storage battery 110 is electrically disconnected and the power supply from the lead storage battery 110 is interrupted, the amount of power supplied from the rotary electric machine 130 to the protected load 160 is restricted from becoming less than the reset threshold. Consequently, the protected load 160 is restricted from being brought into the OFF state.

Additionally, the lead storage battery 110 has a positive electrode, a negative electrode, and a solution. Due to the elongated use of the lead storage battery 110 over the years, intergranular corrosion progresses in the positive and negative electrodes. When the intergranular corrosion progresses, the electrodes may be split and contact between the positive electrode and the negative electrode may cause a short circuit. The short circuit of the lead storage battery 110 resulting from the intergranular corrosion may interrupt the power supply from the lead storage battery 110. However, even when such a short circuit of the lead storage battery 110 occurs during the charging of the lithium storage battery 10, the charge process described above restricts the amount of power supplied from the rotary electric machine 130 to the protected load 160 from becoming less than the reset threshold. As a result, the protected load 160 is restricted from being brought into the OFF state.

In addition, the charging of the lithium storage battery 10 tends to be easily performed to a degree that the charge request threshold is exceeded. As a result, after the power generation from the rotary electric machine 130 is ended, the amount of power supplied from the lithium storage battery 10 to the protected load 160 is restricted from be less than the reset threshold. This also restricts the protected load 160 from being brought into the OFF state.

By reducing the amount of power required by the general load 150, the total power requirement is reduced.

As a result, even when, e.g., the amount of power generated by the rotary electric machine 130 is less than the total power requirement at the beginning of the execution of the charging of the lithium storage battery 10, it is possible to reduce the total power requirement such that the total power requirement approaches and becomes less than the amount of power generated by the rotary electric machine 130. This restricts the protected load 160 from being brought into the OFF state by the interruption of the power supply from the lead storage battery 110.

On detecting the interruption of the power supply from the lead storage battery 110 while bringing the first switch 21 into the closed state and electrically connecting the rotary electric machine 130 and the lithium storage battery 10, the higher-level ECU 170 outputs, to the MGECU 180, a request to increase the amount of power generated by the rotary electric machine 130.

As a result, even when the power supply from the lead storage battery 110 to the protected load 160 is interrupted, the amount of power supplied to the protected load 160 is restricted from decreasing. This more effectively restricts the amount of power supplied to the protected load 160 from becoming less than the reset threshold. Consequently, the protected load 160 is more effectively restricted from being brought into the OFF state.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

(First Modification)

Figure 10:
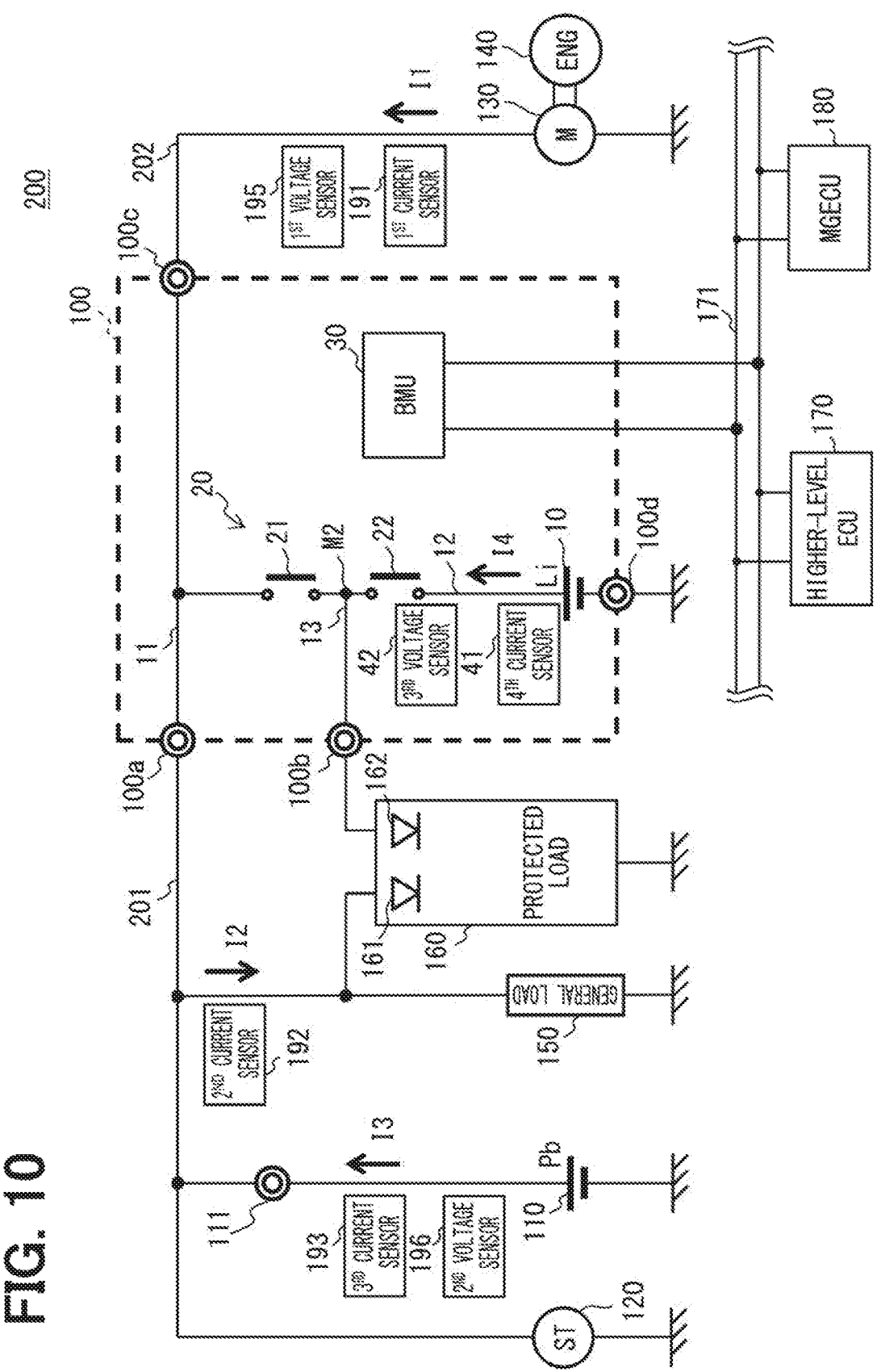
FIG. 10 is a block diagram for illustrating a modification of a battery pack.
Figure 11:
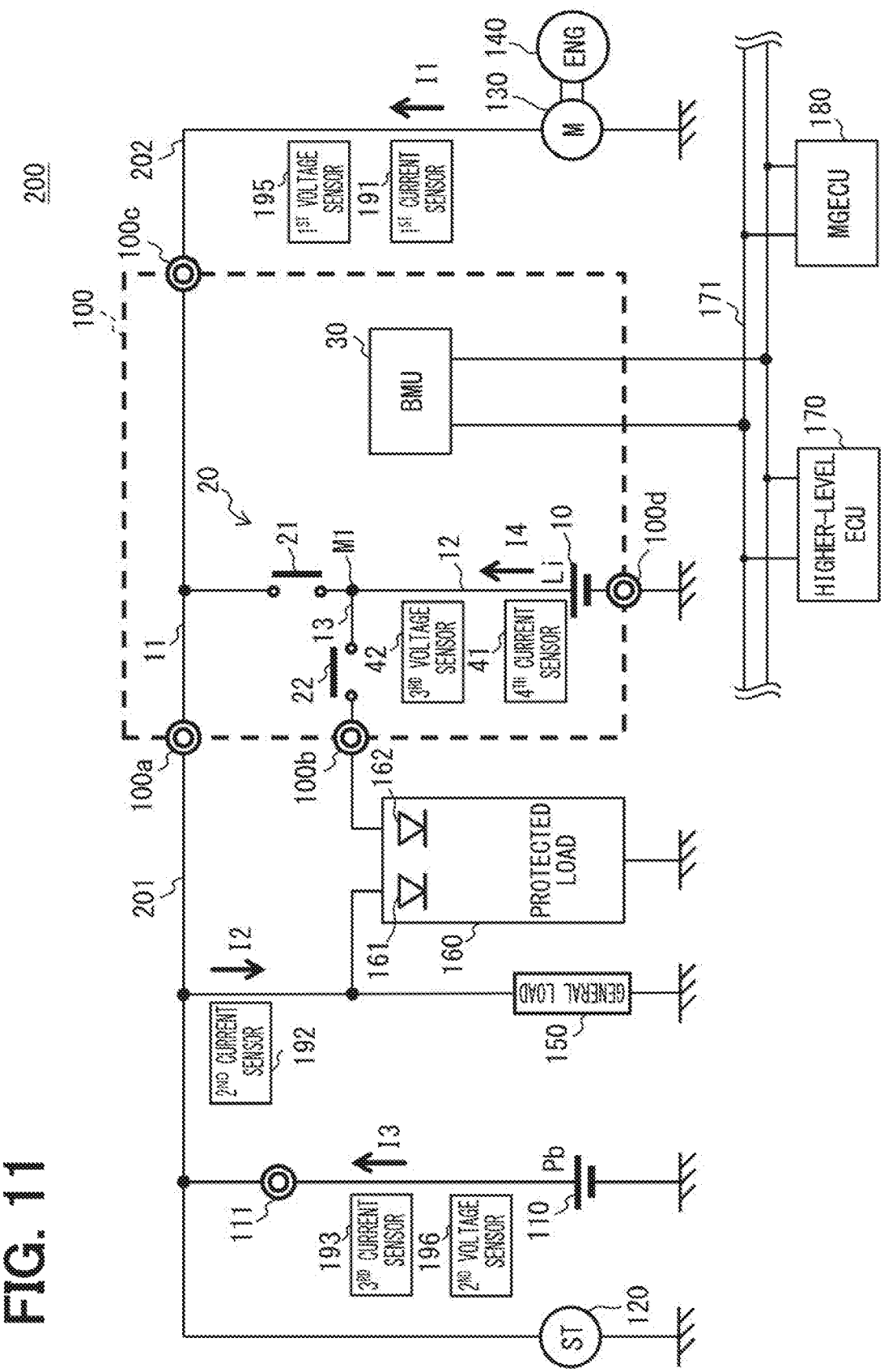
FIG. 11 is a block diagram for illustrating another modification of the battery pack.

The first embodiment has shown the example in which the change-over switch 20 has the first switch 21. However, as shown in FIGS. 10 and 11, the change-over switch 20 may also have a second switch 22 in addition to the first switch 21. The second switch 22 corresponds to a power supply switch.

In the modification shown in FIG. 10, in the second internal wire 12, in a direction from the connection end with the first internal wire 11 toward the connection end with the fourth external connection terminal 100d, the first switch 21, the second switch 22, and the lithium storage battery 10 are connected in series in succession. To a second middle point M2 between the first switch 21 and the second switch 22, the third internal wire 13 is connected. As a result, the protected load 160 is electrically connected to the second middle point M2.

Accordingly, by controlling the first switch 21 into the open state and controlling the second switch 22 into the closed state, it is possible to perform power supply from the lithium storage battery 10 to the protected load 160, while interrupting the electrical connection between the rotary electric machine 130 and the lithium storage battery 10. As a result, the lithium storage battery 10 can perform power supply to the protected load 160 without being affected by the operating state of the rotary electric machine 130.

In addition, by controlling the first switch 21 into the closed state and controlling the second switch 22 into the open state, it is possible to stop the power supply from the rotary electric machine 130 to the lithium storage battery 10, while continuing the power supply from the rotary electric machine 130 to the protected load 160. In other words, it is possible to restrict the lithium storage battery 10 from being excessively charged, while continuing the power supply from the rotary electric machine 130 to the protected load 160.

In the modification shown in FIG. 11, in the third internal wire 13, the second switch 22 is provided. Accordingly, by controlling the first switch 21 into the open state and controlling the second switch 22 into the closed state, it is possible to perform power supply from the lithium storage battery 10 to the protected load 160, while interrupting the electrical connection between the rotary electric machine 130 and the lithium storage battery 10. As a result, the lithium storage battery 10 can perform power supply to the protected load 160 without being affected by the operating state of the rotary electric machine 130.

(Second Modification)

Figure 12:
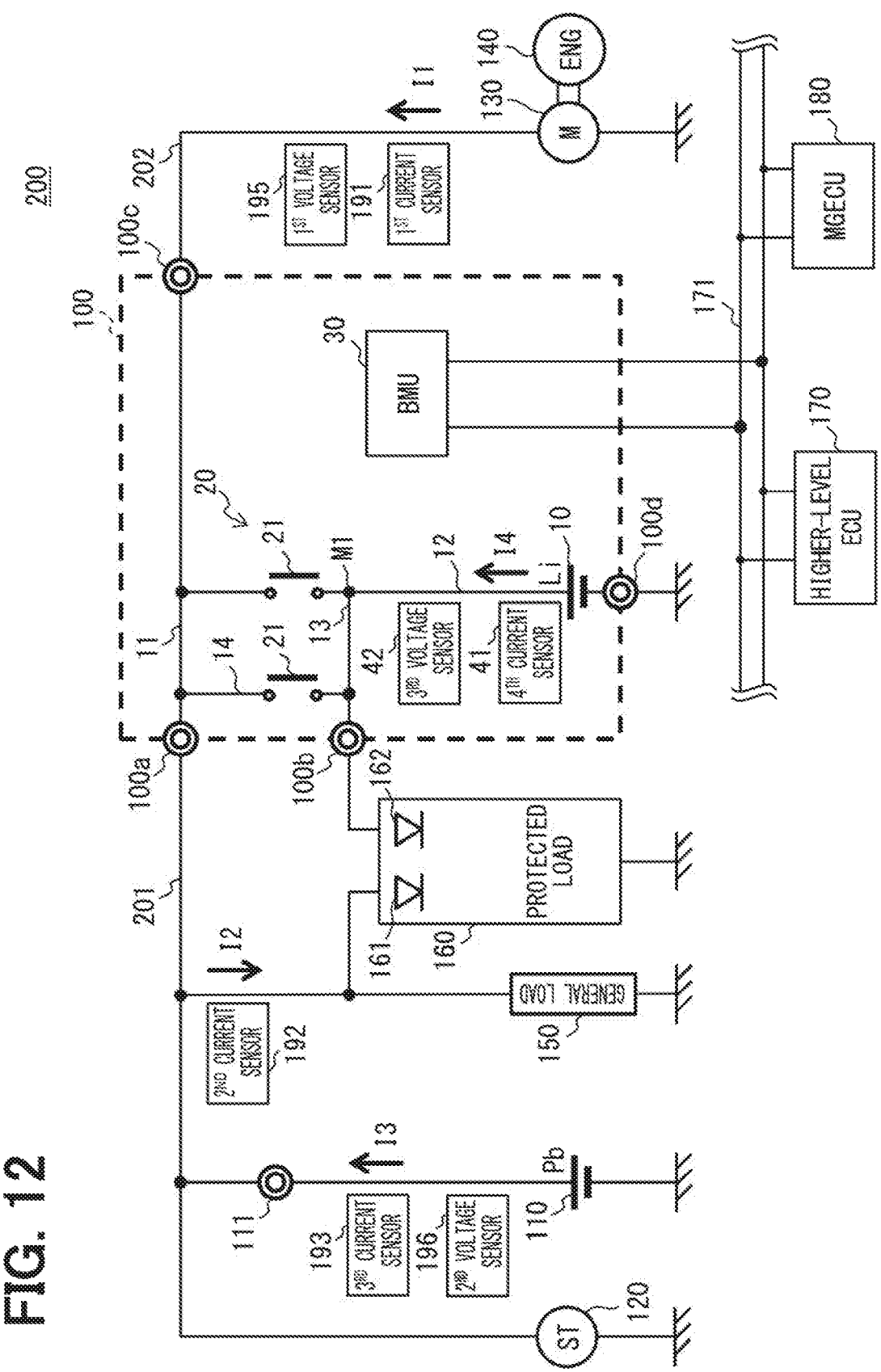
FIG. 12 is a block diagram for illustrating still another modification of the battery pack.

The first embodiment has shown the example in which the change-over switch 20 has the one first switch 21. However, the change-over switch 20 may also have a plurality of the first switches 21. In the modification shown in FIG. 12, the change-over switch 20 has the two parallel-connected first switches 21. The first internal wire 11 and the third internal wire 13 are electrically connected via a fourth internal wire 14. In the fourth internal wire 14, the new first switch 21 is provided.

Accordingly, even when a problem arises in any of the plurality of first switches 21, it is possible to control the electrical connection between the lithium storage battery 10 and the rotary electric machine 130.

(Third Modification)

Figure 13:
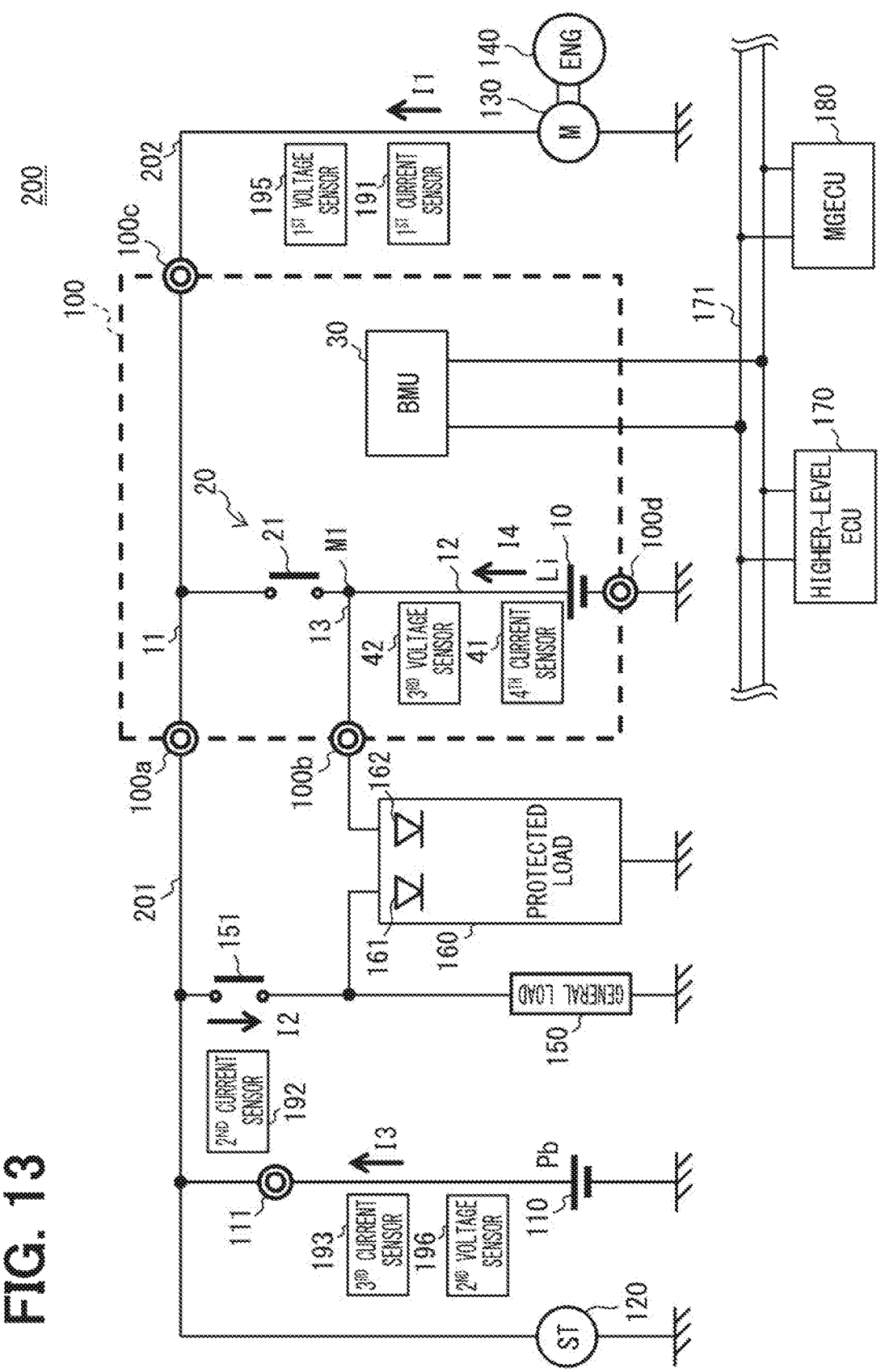
FIG. 13 is a block diagram for illustrating a modification of a power source system.

The first embodiment has shown the example in which each of the general load 150 and the protected load 160 is electrically connected directly to the lead storage battery 110. However, as shown in FIG. 13, it is also possible to adopt a configuration in which each of the general load 150 and the protected load 160 is electrically connected indirectly to the lead storage battery 110 through a limit switch 151. Accordingly, by bringing the limit switch 151 into the open state, it is possible to stop the power supply to the general load 150. Consequently, by controlling the limit switch 151 to be opened or closed, it is possible to control the amount of power required by the general load 150. This allows the total power requirement to be controlled. The limit switch 151 is included in the power source system 200 and controlled to be opened or closed by the higher-level ECU 170.

Note that the limit switch 151 need not necessarily be provided to be shared by the general load 150 and the protected load 160. The limit switch 151 may also be provided only in the general load 150.

(Fourth Modification)

Figure 14:
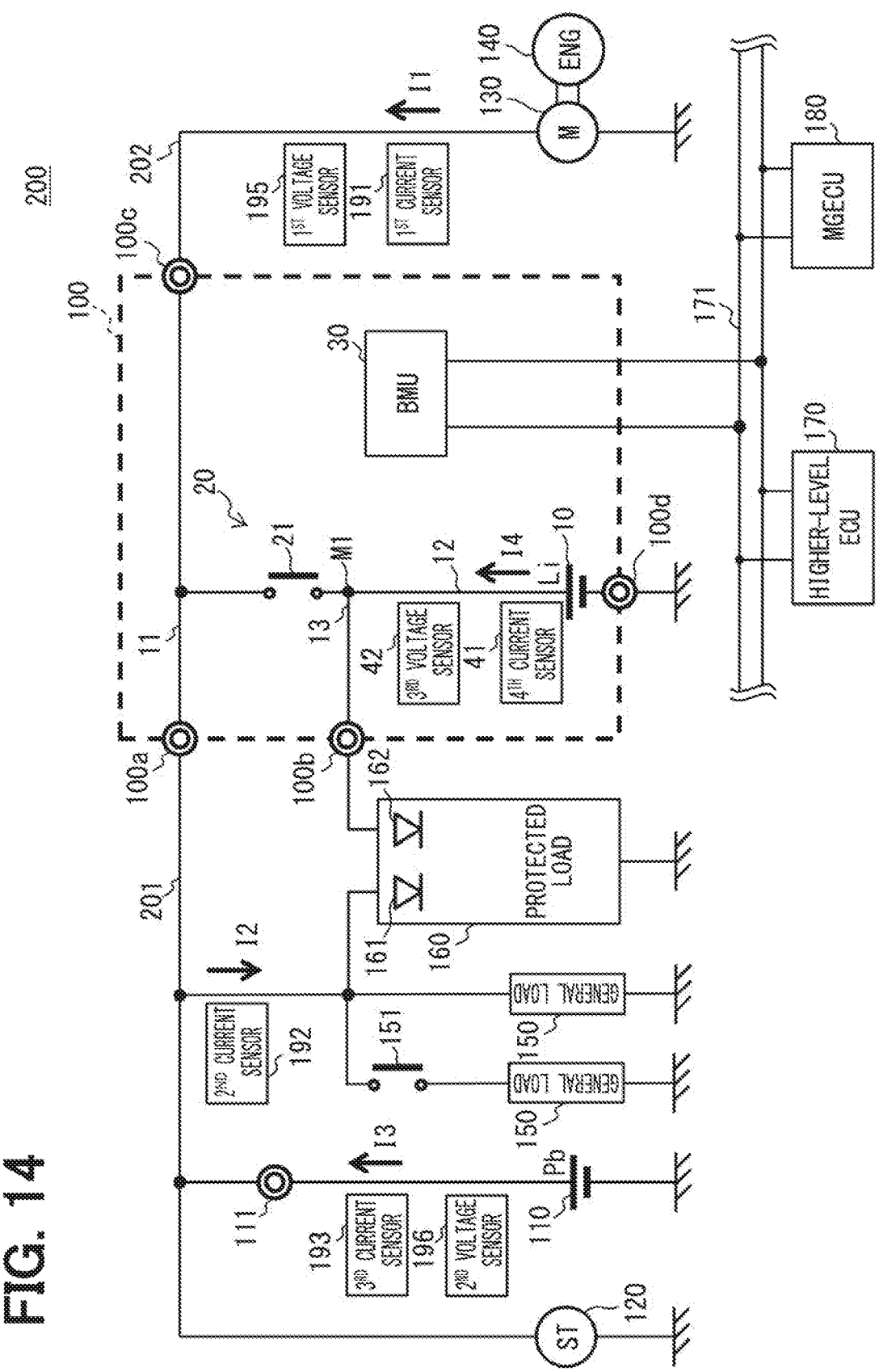
FIG. 14 is a block diagram for illustrating another modification of the power source system.

It is also be possible to adopt a configuration in which, unlike in the third modification, the limit switch 151 is provided in at least one of the plurality of general loads 150. In the modification shown in FIG. 14, one of the two general loads 150 is electrically connected directly to the lead storage battery 110. The other one general load 150 is electrically connected indirectly to the lead storage battery 110 through the limit switch 151. Accordingly, by gradually restricting the operation of the general load 150 electrically connected directly to the lead storage battery 110, the total power requirement can gradually be reduced. By bringing the limit switch 151 into the open state, it is possible to inhibit the operation of the general load 150 electrically connected indirectly to the lead storage battery 110 and reduce the total power requirement at once.

As the general load 150 thus electrically connected directly to the lead storage battery 110, a general load which is relatively closely associated with vehicle running and for which a sudden operation change should be avoided can be used. For example, a room light, a headlight, wipers, or the like can be used. As the general load 150 electrically connected indirectly to the lead storage battery 110, a general load which is relatively remotely associated with vehicle running and for which a sudden operation change is allowable can be used. For example, a seat heater, a blast fan, an electric compressor, or the like can be used. This allows the speed at which the total power requirement decreases to be controlled in accordance with the respective properties of the plurality of general loads 150.

(Fifth Modification)

The first embodiment has shown the example in which the power source system 200 has the first wire 201 electrically connecting the lead storage battery 110, the general load 150, and the protected load 160 to each other and the second wire 202 electrically connected to the rotary electric machine 130, which are independent of each other. However, the power source system 200 may also have the first wire 201 having the function of the second wire 202. In other words, a configuration in which the rotary electric machine 130 is connected to the first wire 201 may also be adopted.

Figure 15:
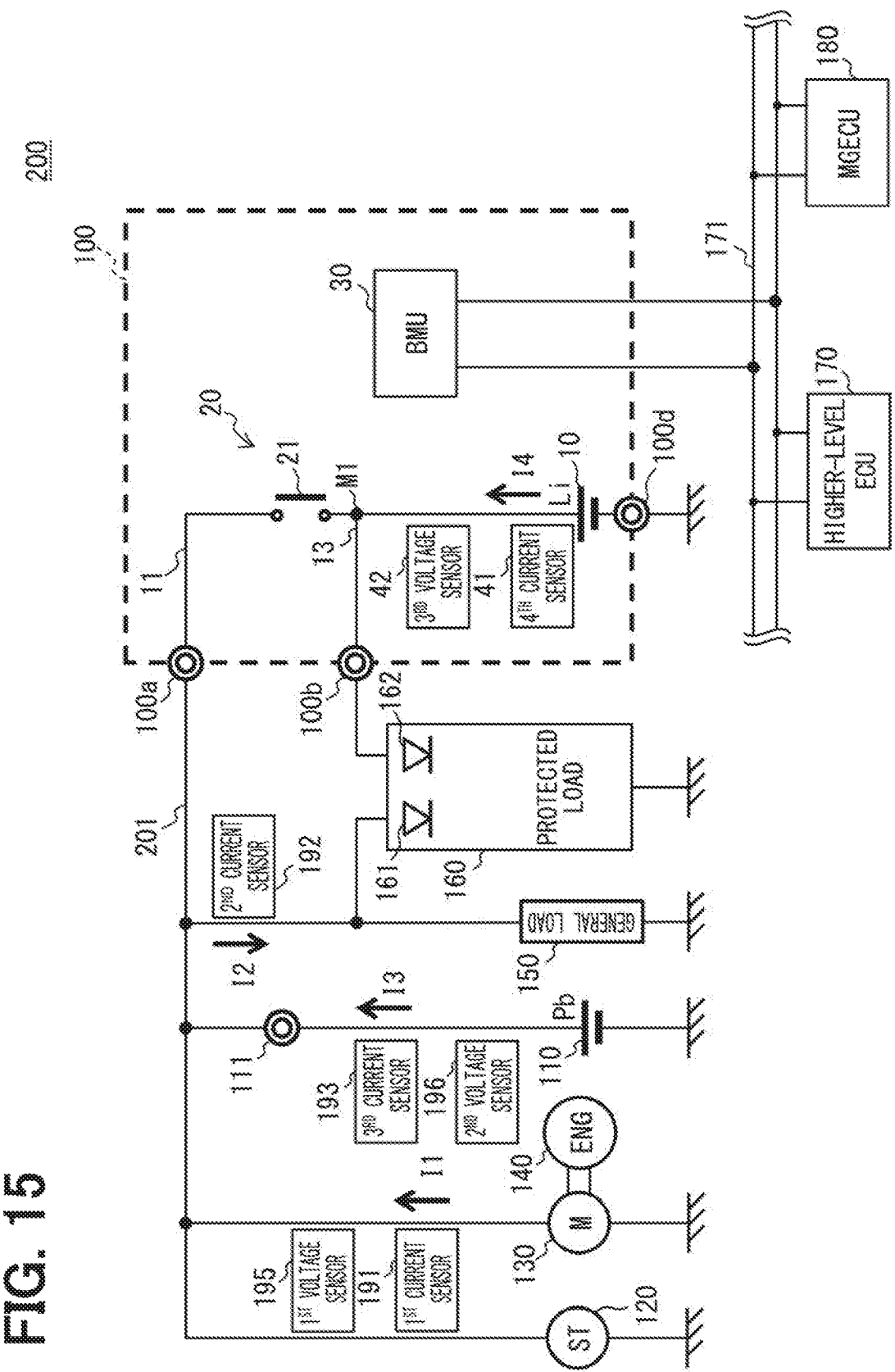
FIG. 15 is a block diagram for illustrating still another modification of the power source system.
Figure 16:
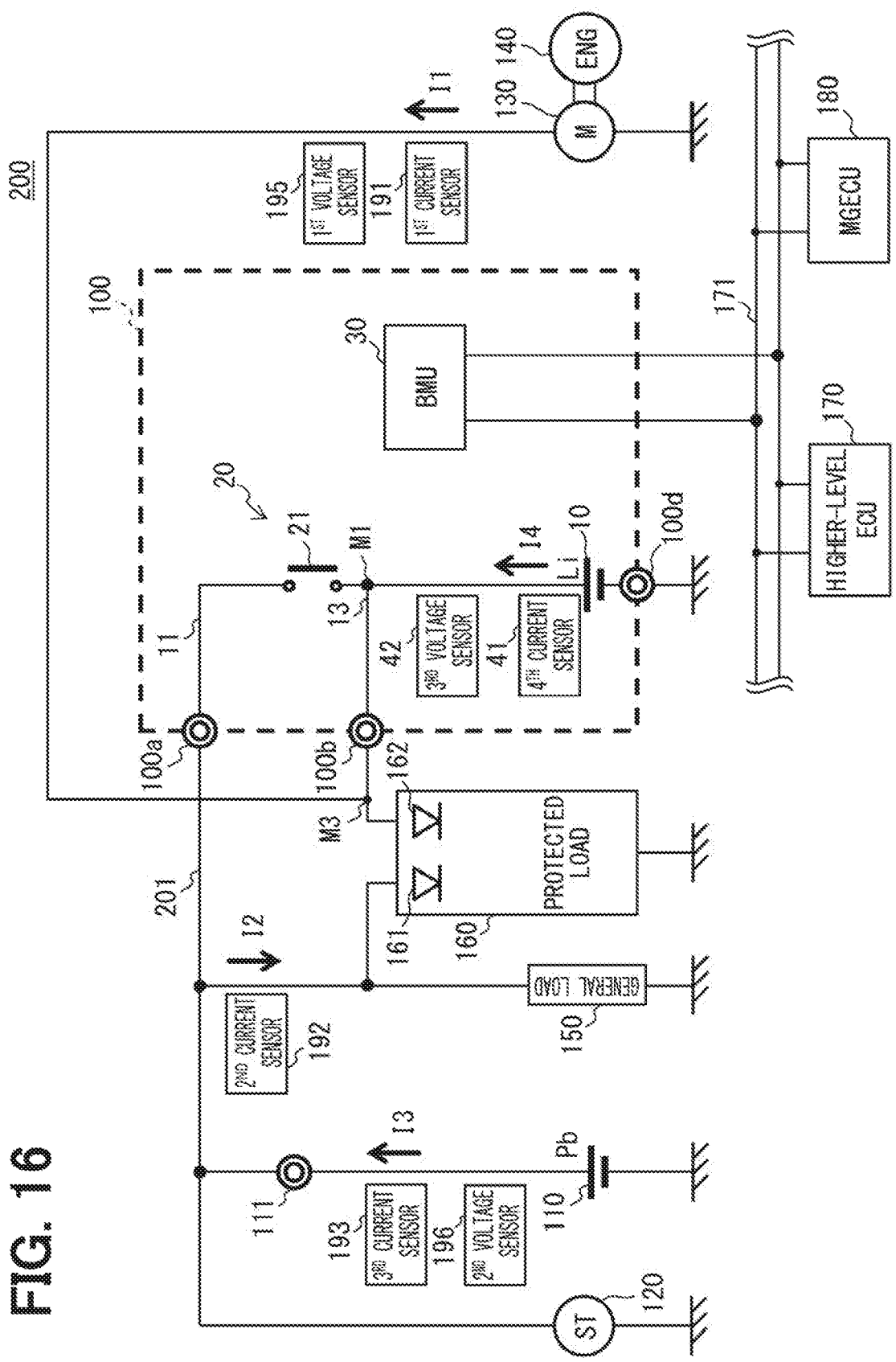
FIG. 16 is a block diagram for illustrating yet another modification of the power source system.

In this case, as shown in FIGS. 15 and 16, the battery pack 100 no longer has the third external connection terminal 100c. As a result, the first internal wire 11 electrically connects the first external connection terminal 100a and the fourth external connection terminal 100d. In the first internal wire 11, the first switch 21 and the lithium storage battery 10 are provided. To the first middle point M1 therebetween, one end of the third internal wire 13 is connected. The other end of the third internal wire 13 is connected to the second external connection terminal 100b.

In the case of the modification shown in FIG. 15, the rotary electric machine 130 is connected between the starter motor 120 and the lead storage battery 110 in the first wire 201.

In the case of the modification shown in FIG. 16, the rotary electric machine 130 is connected to a third middle point M3 between the protected load 160 and the second external connection terminal 100b of the battery pack 100. The third middle point M3 corresponds to a second middle point.

In the case of the modification shown in FIG. 16, by bringing the first switch 21 into the closed state, it is possible to supply the power generated by the rotary electric machine 130 not to the general load 150, but to each of the protected load 160 and the lithium storage battery 10. Accordingly, even when the amount of charge of the lithium storage battery 10 is reduced, it is possible to quickly charge the lithium storage battery 10.

(Sixth Modification)

The first embodiment has shown the example in which the change-over switch 20 is controlled to be opened or closed through the outputting of the control signal from the BMU 30 based on the control instruction from the higher-level ECU 170. However, unlike in the example, the change-over switch 20 may also be controlled to be opened or closed through the outputting of a control signal from the higher-level ECU 170 directly to the change-over switch 20.

The example has been shown in which, as shown in FIGS. 2 and 3, the BMU 30 and the hither-level ECU 170 perform cooperative control to allow the charge process for the lithium storage battery 10 to be performed. However, it may also be possible that the higher-level ECU 170 solely performs the charge process for the lithium storage battery 10 by acquiring information required for the charge process for the lithium storage battery 10 from the BMU 30.

(Seventh Modification)

The first embodiment has shown the example in which the restriction of the amount of power required by the general load 150 which is remotely associated with vehicle running is preferentially performed. However, there are various other methods for restricting the amount of required power. For example, one of the methods uniformly reduces the respective amounts of power required by the plurality of general loads 150. Another of the methods increases a reduction in the amount of power required by the general load 150 less closely associated with vehicle running compared to that in the amount of power required by the general load 150 more closely related to vehicle running. Such various methods can be adopted. Needless to say, it may also be possible to appropriately combine such various methods and restrict the amount of power required by the general load 150.

(Eighth Modification)

The present embodiment has shown the example in which the vehicle in which the power source system 200 is mounted has the idling stop function. However, the vehicle in which the power source system 200 is mounted is not limited to that in the example shown above. As the vehicle, any of an engine automobile, a hybrid automobile, and an electric automobile can be used.

(Ninth Modification)

The configuration has been shown in which the rotary electric machine 130 is coupled to the engine 140 via a belt or the like. Specifically, by way of example, the configuration has been shown in which the rotary electric machine 130 is an alternator or an ISG. However, the rotary electric machine 130 is not limited to that in the example shown above. It is also possible to adopt a configuration in which the rotary electric machine 130 is coupled to the engine 140 via a power transfer mechanism. As the rotary electric machine 130, a motor generator can also be used. The rotary electric machine 130 is not particularly limited as long as the rotary electric machine 130 has the function of generating power using at least one of the rotation energy of the engine 140 and the rotation energy of the wheels of the vehicle.

(Tenth Modification)

The example has been shown in which the battery pack 100 has the fourth current sensor 41, the third voltage sensor 42, and the temperature sensor. However, the battery pack 100 may also have another sensor.

For example, the battery pack 100 may also have an immersion sensor for detecting the immersion thereof. The immersion sensor has a capacitor including opposed electrodes. When there is water between the opposed electrodes, the dielectric constant (electrostatic capacitance) of the capacitor changes. The BMU 30 detects the immersion of the battery pack 100 on the basis of whether or not the change in the electrostatic capacitance of the immersion sensor continues for a predetermined period. Note that the immersion sensor is provided closer to the bottom portion of the housing than the wiring substrate.

(Eleventh Modification)

In the present embodiment, the material which forms the change-over switch 20 is not prescribed but, as the change-over switch 20, a semiconductor switch can be used. However, when the speed at which the switch is changed from the closed state to the open state and from the open state to the closed state is sufficient to allow for the switching of the vehicle state such as from parking to engine drive or the like, e.g., a mechanical relay can also be used as the change-over switch 20.

When the semiconductor switch is used as the change-over switch 20, specifically, a MOSFET or an IGBT can be used.

When the MOSFET is used as the change-over switch 20, specifically, an N-channel MOSFET or a P-channel MOSFET can be used.

The change-over switch 20 may also include a plurality of MOSFETs. For example, the first switch 21 can adopt a configuration having at least one open/close part including two series-connected MOSFETs. The two MOSFETs included in the open/close part have respective gate electrodes electrically independent of each other. Alternatively, the gate electrodes of the two MOSFETs are at the same potential. The two MOSFETs have respective source electrodes coupled together. The two MOSFETs have parasitic diodes having respective anode electrodes coupled together. Alternatively, the two MOSFETs have respective drain electrodes coupled together. The two MOSFETs have parasitic diodes having respective cathode electrodes coupled together.

The first switch 21 may also include a plurality of the parallel-connected open/close parts. The number of the open/close parts may also be design-changed appropriately in accordance with the magnitude of the current flowing in the first switch 21.

When a configuration in which the plurality of open/close parts are connected in parallel is adopted, in the configuration in which the two MOSFETs included in each of the open/close parts have respective source electrodes coupled together, it is also possible to adopt a configuration in which the respective source electrodes of the plurality of open/closed parts are electrically connected to each other. Alternatively, it is also possible to adopt a configuration in which the respective source electrodes of the plurality of open/close parts are not electrically connected to each other. Still alternatively, it is also possible to adopt a configuration in which the source electrodes of some of the plurality of open/close parts are electrically connected to each other. The same applies also to a configuration in which the respective drain electrodes of the two MOSFETs included in each of the open/close parts are coupled together.

Note that, in the case where the IGBT is used as the change-over switch 20 as described above, the open/close part may also include two IGBTs. However, in this case, it is appropriate to connect diodes in parallel to the two IGBTs. The respective cathode electrodes or anode electrodes of the two diodes are connected to each other.

Note that the present modification has described the specific configuration of the first switch 21 of the change-over switch 20 described in the first embodiment. However, needless to say, this specific configuration is also applicable to the second switch 22 and to the limit switch 151 in the other modifications.

The invention claimed is:

1. A power source control device to be provided in a power source system, the power source system including:
   a first power source;
   a power generator;
   a first electrical load electrically connected to each of the first power source and the power generator;
   a second electrical load electrically connected to the power generator and brought into an OFF state when an amount of supplied power becomes less than a reset threshold;
   a second power source electrically connected to each of the second electrical load and the power generator; and
   a charge/discharge switch provided between the second power source and the power generator,
   wherein, when an amount of charge of the second power source is less than a charge request threshold, the power generator is in a power generating state, and an amount of power generated by the power generator is equal to or more than a total power requirement as a total sum of respective amounts of power required by the second power source, the first electrical load, and the second electrical load, the charge/discharge switch is brought into a closed state to electrically connect the power generator to the second power source.

2. The power source control device according to claim 1, wherein, when the amount of charge of the second power source is less than the charge request threshold, the power generator is in the power generating state, and the amount of power generated by the power generator is less than the total power requirement, the amount of power required by the first electrical load is reduced to reduce the total power requirement.

3. The power source control device according to claim 1,
wherein the second electrical load is electrically connected not only to the power generator, but also to the first power source, and
wherein, when an interruption of the power supply from the first power source is detected while the charge/discharge switch is in the closed state to electrically connect the power generator to the second power source, a request to increase the amount of power generated by the power generator is output to a power generation control unit which controls driving of the power generator.

4. A battery pack to be provided in a power source system, the power source system including:
a first power source;
a power generator;
a first electrical load electrically connected to each of the first power source and the power generator; and
a second electrical load electrically connected to the power generator and brought into an OFF state when an amount of supplied power becomes less than a reset threshold,
the battery pack comprising:
a second power source electrically connected to each of the second electrical load and the power generator;
a charge/discharge switch provided between the second power source and the power generator; and
a battery control unit configured to control the charge/discharge switch to be opened or closed,
wherein, when an amount of charge of the second power source is less than a charge request threshold, the power generator is in a power generating state, and an amount of power generated by the power generator is equal to or more than a total power requirement as a total sum of respective amounts of power required by the second power source, the first electrical load, and the second electrical load, the battery control unit controls the charge/discharge switch into a closed state to electrically connect the power generator to the second power source.

5. The battery pack according to claim 4, further comprising:
a power supply switch provided between the second power source and the second electrical load,
wherein the battery control unit controls not only the charge/discharge switch, but also the power supply switch to be opened or closed, and
wherein the battery control unit controls the power supply switch to be opened or closed so as to control an electrical connection between the second power source and the second electrical load.

6. The battery pack according to claim 5,
wherein the charge/discharge switch and the power supply switch are connected in series,
wherein the second power source is electrically connected to the power generator through each of the charge/discharge switch and the power supply switch, and
wherein the second electrical load is electrically connected to a middle point between the charge/discharge switch and the power supply switch and electrically connected to the power generator through the charge/discharge switch.

7. The battery pack according to claim 4,
wherein the charge/discharge switch includes a plurality of the charge/discharge switches, and
wherein the plurality of charge/discharge switches are connected in parallel.

8. The battery pack according to claim 4,
wherein the power source system includes a higher-level control unit,
wherein the battery control unit and the higher-level control unit are included in a power source control device, and
wherein the battery control unit operates on the basis of a control instruction from the higher-level control unit.

9. A power source system, comprising;
a first power source;
a power generator;
a first electrical load electrically connected to each of the first power source and the power generator;
a second electrical load electrically connected to the power generator and brought into an OFF state when an amount of supplied power becomes less than a reset threshold;
a second power source electrically connected to each of the second electrical load and the power generator;
a charge/discharge switch provided between the second power source and the power generator; and
a power source control device configured to control the charge/discharge switch to be opened or closed,
wherein, when an amount of charge of the second power source is less than a charge request threshold, the power generator is in a power generating state, and an amount of power generated by the power generator is equal to or more than a total power requirement as a total sum of respective amounts of power required by the second power source, the first electrical load, and the second electrical load, the power source control device brings the charge/discharge switch into a closed state to electrically connect the power generator to the second power source.

10. The power source system according to claim 9,
wherein, when the amount of charge of the second power source is less than the charge request threshold, the power generator is in the power generating state, and the amount of power generated by the power generator is less than the total power requirement, the power source control device reduces the amount of power required by the first electrical load to reduce the total power requirement.

11. The power source system according to claim 9, further comprising:
a limit switch provided between the power generator and the first electrical load,
wherein the power source control device controls not only the charge/discharge switch, but also the limit switch to be opened or closed.

12. The power source system according to claim 11,
wherein the first electrical load includes a plurality of the first electrical loads,
wherein the limit switch is provided between at least one of the plurality of first electrical loads and the power generator, and
wherein the power source control device restricts the amount of power required by the first electrical load connected to the power generator without interposition of the limit switch between the first electrical load and the power generator to reduce the amount of power required by the first electrical load.

13. The power source system according to claim 9,
wherein the second electrical load is electrically connected to a first middle point between the charge/discharge switch and the second power source, and wherein the power generator is electrically connected to a second middle point between the second electrical load and the first middle point.

14. The power source system according to claim 9, wherein the power source control device includes a battery control unit and a higher-level control unit electrically connected to the battery control unit, and wherein the battery control unit operates on the basis of a control instruction from the higher-level control unit.

15. The power source system according to claim 14, wherein the higher-level control unit outputs a control signal to the charge/discharge switch to control the charge/discharge switch to be opened or closed.

16. The power source system according to claim 9, further comprising:
    a first wire electrically connecting the first power source, the first electrical load, and the second electrical load to each other; and
    a second wire electrically connected to the power generator,
    wherein the first wire and the second wire are independent of each other.

17. The power source system according to claim 9, further comprising:
    a first wire electrically connecting the first power source, the first electrical load, and the second electrical load to each other; and
    a second wire electrically connected to the power generator,
    wherein the first wire includes the second wire.

* * * * *